United States Patent
Brown et al.

[19]

[11] Patent Number: 6,148,751
[45] Date of Patent: Nov. 21, 2000

[54] VIBRATION AND DRAG REDUCTION SYSTEM FOR FLUID-SUBMERSED HULLS

[75] Inventors: Neal A. Brown, Lexington, Mass.; Victor G. Grinius, San Diego; Cam M. Shaar, Santa Barbara, both of Calif.

[73] Assignee: High Seas Engineering, LLC, Escondido, Calif.

[21] Appl. No.: 09/213,597

[22] Filed: Dec. 16, 1998

[51] Int. Cl.[7] ........................................................ B63B 1/34
[52] U.S. Cl. ........................ 114/67 A; 114/264; 114/265
[58] Field of Search ................................ 114/67 A, 67 R, 114/264, 265, 56.1, 61.27; 244/207; 296/180.1

[56] References Cited

U.S. PATENT DOCUMENTS

| | | | |
|---|---|---|---|
| 2,663,276 | 12/1953 | Ouellet | 114/67 A |
| 3,667,239 | 6/1972 | Mott | 114/264 |
| 5,908,217 | 6/1999 | Englar | 296/208 |

FOREIGN PATENT DOCUMENTS

| | | | |
|---|---|---|---|
| 586613 | 3/1925 | France | 114/67 A |

OTHER PUBLICATIONS

P. Carriere and E.A. Eichelbrenner, "Theory of Flow Reattachment by a Tangential Jet Discharging Against A Strong Adverse Pressure Gradient," in Boundary–layer and flow control, vol. I, G.V. Lachmann, ed., Pergamon Press, New York, 1961.

James E. Hubbartt and Louis H. Bangert, "Turbulent/Boundary Layer Control by a Wall Jet," AIAA Paper 70–107, 8th Aerospace Sciences Meeting, New York, NY/Jan. 19–21, 1970.

F.R. Goldschmied, "Integrated Hull Design, Boundary–Layer Control, and Propulsion of Submerged Bodies," Journal of Hydronautics, vol. 1, No. 1, pp. 2–11, 1967.

J.B. Freund & M.G. Mungal, "Drag Modification and Wake Control of an Axisymmetric Bluff Body Using the Coanda Effect," Mechanical Engineering Department, Stanford University, Stanford, CA, 1992 pp. 775–784 (published by the American Institute of Aeronautics and Astronautics, Inc.).

Bryan Thwaites, "Incompressible Aerodynamics An Account of the Theory and Observation of the Steady Flow of Incompressible Fluid past Aerofoils, Wings, and Other Bodies," Oxford, Oxfordshire: Clarendon Press, 1960 pp. 226–229.

Paul K. Chang, "Control of Flow Separation Energy Conservation, Operational, Efficiency, and Safety," Chapter 5, Series in Thermal and Fluids Engineering, James P. Hartnett and Thomas F. Irvine, Jr., eds., Hemisphere Publishing Corp., McGraw–Hill Book Company, pp. 286–412.

Terry N. Gardner & M. Wayne, Jr., "Deepwater Drilling in High Current Environment" 4th Annual OTC in Houston, TX, May 3–6, 1982.

Brown, N. A., Report of the ATC Hydro–Propulsion Committee, Feb. 28, 1979.

*Primary Examiner*—Ed Swinehart
*Attorney, Agent, or Firm*—Fish & Richardson P.C.

[57] ABSTRACT

A system for reducing hydrodynamic drag and vortex-induced-vibration ("VIV") in a bluff hull. In a bluff hull that is designed to be at least partially submerged in a fluid, such as water, the hull has an internal area for holding or transferring fluid. When the hull is beset by a current present in the water, the surface of the bluff hull has an up-current side and a down-current side. The hull surface has at least one opening, preferably a slot-nozzle, for blowing the fluid from the internal fluid area of the bluff hull out of the hull surface and into the surrounding water at a velocity greater than the current velocity, so as to reduce flow separation of the current on the down-current side of the hull surface. Also, preferably, the fluid is blown out of the opening at an angle substantially tangential to the hull surface at the location of the opening and substantially in the direction of the current.

5 Claims, 18 Drawing Sheets

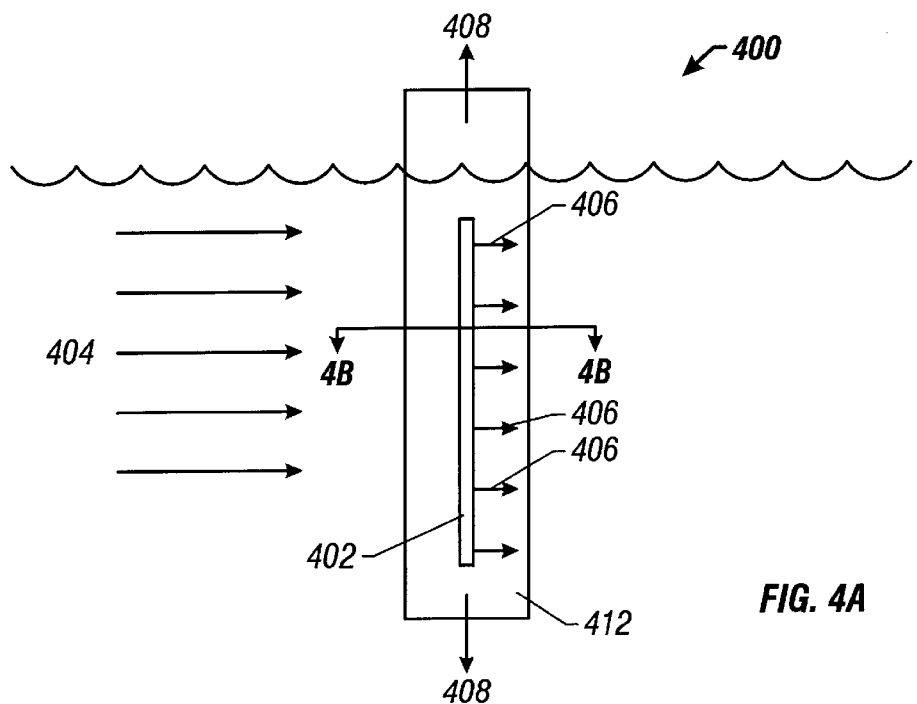
FIG. 4A
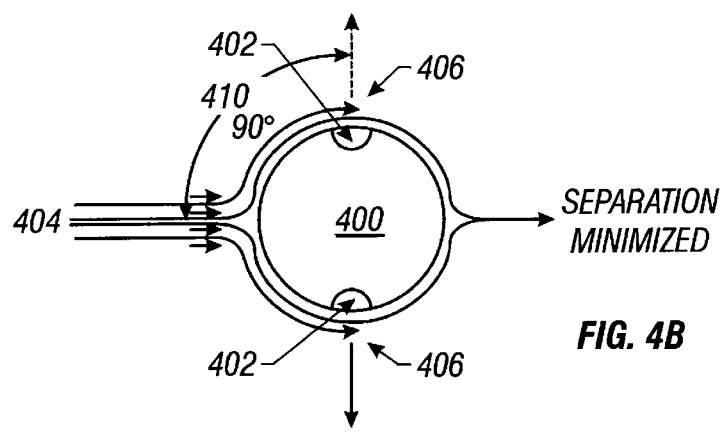
FIG. 4B
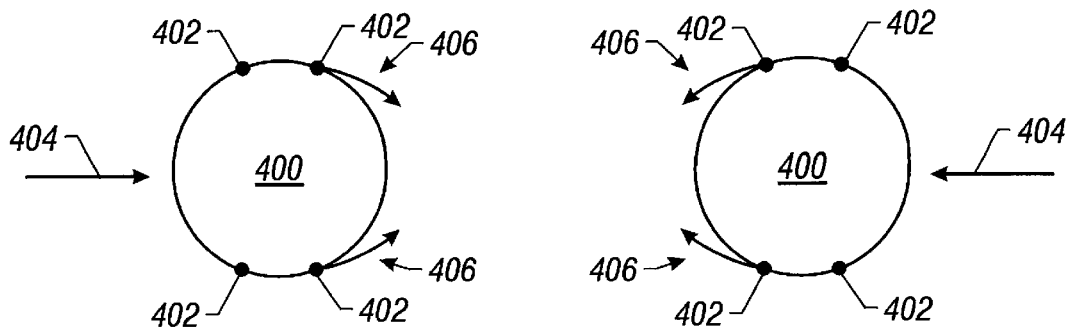
FIG. 4C  FIG. 4D

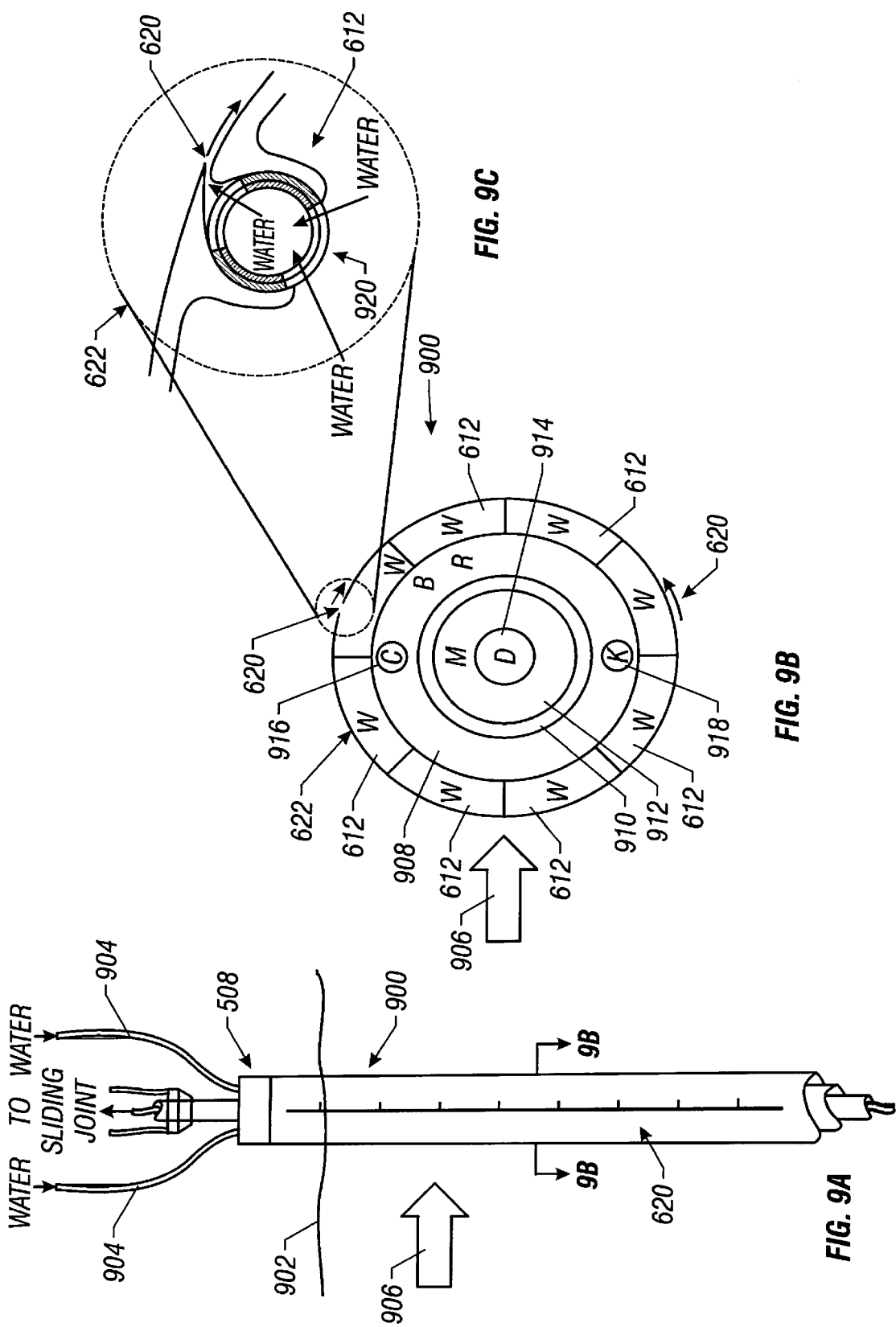

Drag Coefficient and Reciprocal of Strouhal Number

Pressure Distributions

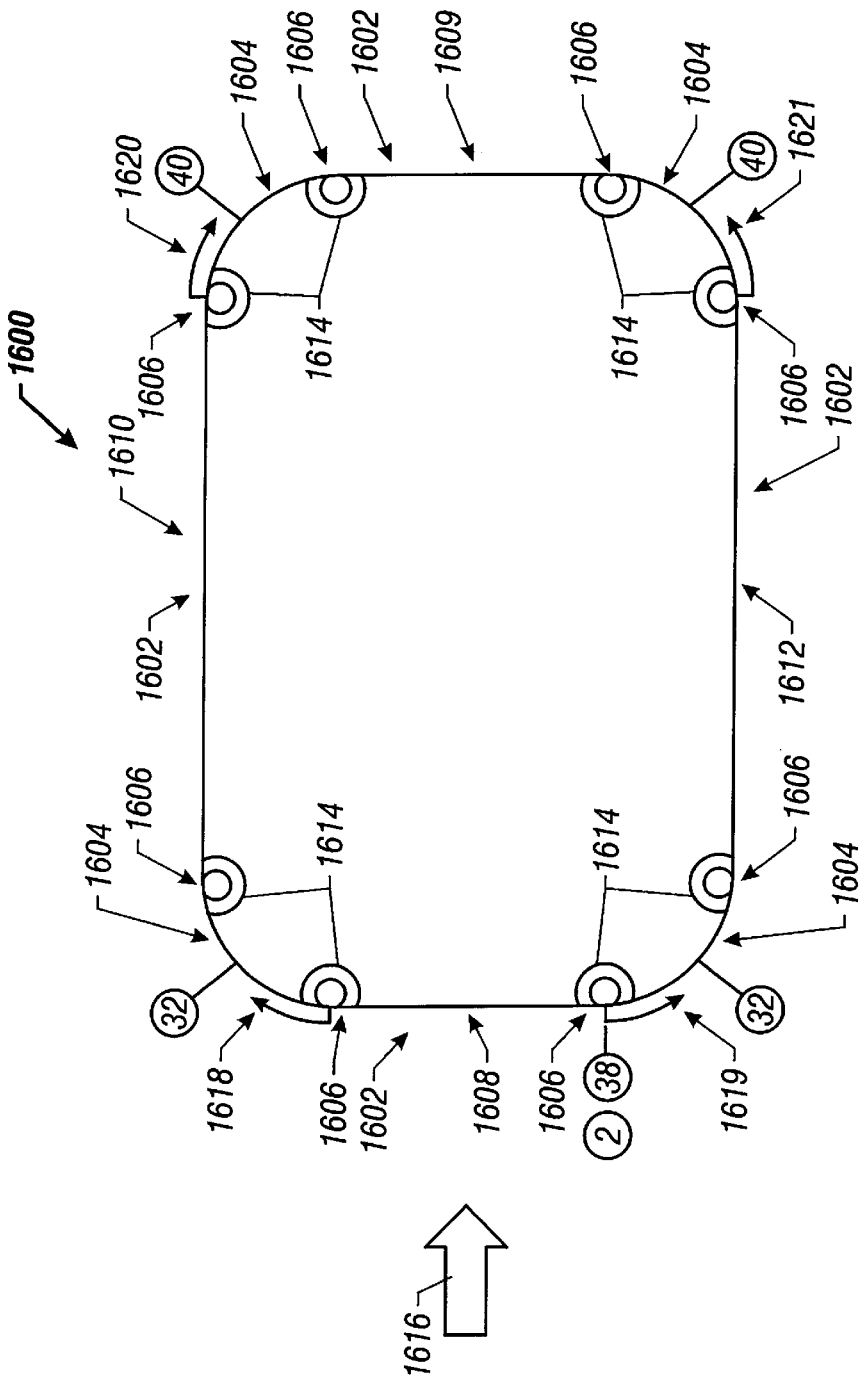

VIBRATION AND DRAG REDUCTION SYSTEM FOR FLUID-SUBMERSED HULLS

TECHNICAL FIELD

This invention relates to a system for reducing vibrations and drag in fluid-submersed hulls. More particularly, the invention relates to a boundary layer control system that reduces the hydrodynamic drag and shed-vortex induced vibrations on bluff hulls at least partially submersed in water, such as SPARs, marine risers that connect a floating drilling vessel to the ocean floor, and semi-submersible ocean drilling vessels.

BACKGROUND

FIG. 1A is a side-view of a SPAR 100. The SPAR 100 is a large un-propelled vessel of generally circular-cylindrical form that is oriented in the sea 102 with its long as 104 vertical. When ballasted, the SPAR 100 exhibits a very deep draft in comparison with its diameter 106 and/or its freeboard 108, thus providing a very stable platform of large volume for offshore petroleum production and storage. SPAR vessels can be positioned and restrained by an elaborate system of moorings, such as moorings 110, which may be anchored to the ocean floor 111.

When beset by ocean currents 112, a SPAR 100 will exhibit substantial drag forces and large scale, long period, shed-vortex induced vibrations ("VIV"). As shown in FIG. 1B, which is a top-view of SPAR 100, VIV is induced when currents 112 travel around the hull of the SPAR 100, forming a down-current pressure gradient 114 and assymetrical circular eddies 116. The assymetrical nature of these eddies 116 causes the SPAR 100 to oscillate orthogonally relative to the currents 112 These oscillations are known as VIV.

A system that has been used to attenuate such VIV is the addition of large scale helical "strakes" 118 to the exterior of the hull of the SPAR 100. While the addition of the strakes 118 may reduce VIV, the strakes 118 actually increase drag and cause the mooring systems 110 to be overwhelmed in the face of currents. This forces the development and use of means other than the strakes 118 to reduce drag and relieve the stress on mooring systems.

FIGS. 2A and 2B show a marine riser 200. Marine risers 200 are used to connect a floating drilling vessel 202 to the ocean floor 204 and to provide a conduit for a drill string and drilling fluids. Like SPAR 100, when beset by ocean currents 206, marine riser 200 will exhibit substantial hydrodynamic drag forces and VIV. Such forces and motions induce mechanical stresses in, and deflections of, the marine riser 200 and its connection 210 to the drilling vessel 202 and connection 212 to the ocean floor 204, which ultimately may result in failure or interference with drilling operations.

Drag and VIV have been reduced by the application of fairings 214 to the marine riser 200. The fairings 214 are enabled passively to rotate about the riser 200 in order to align with the direction of the current 206 to minimize drag. While some drag and VIV reduction is thereby obtained, the procedure for applying and removing fairing segments from riser joints while they are being run and retrieved is lengthy. Slowed riser deployment and retrieval reduces availability and safety of the drilling rig, with important economic consequences. Fairings 214 suffer another disadvantage, in that fairing sections are bulky, expensive, and subject to damage when being deployed through the ocean surface wave zone.

FIGS. 3A and 3B show a semi-submersible drilling vessel 300. Such vessels 300 are often configured as a platform 302 supported well above the ocean surface 304 on submerged longitudinal cylindrical buoyancy pontoons 308. When beset by ocean currents 310, the pontoons 308, being generally bluff, cylindrical objects, exhibit substantial hydrodynamic drag due to flow separation. In order to maintain position relative to the ocean floor 312, such vessels 300 are fitted with a system of moorings 314 and/or powered thrusters 316 to counter the drag forces.

Both moorings 314 and thrusters 316, however, are expensive, and moorings 314 become impractical in very deep water. The presence of mooring winches 318 adds substantially to the topside weight carried by semi-submersible drilling vessels 300. This increase in weight reduces the payload capacity of the vessel 300 and impairs its hydrostatic stability.

Hydrodynamic drag of a semi-submersible drilling vessel 300 can be reduced to a degree by rotating the vessel 300 so that the submerged pontoons 308 are aligned with the direction of current 310 and those located down-current are relatively "shadowed" by those located up-current, as shown in FIG. 3B, which is an end-view of FIG. 3A. Newer designs of semi-submersible drilling vessels are intended to be more azimuthally uniform in their hydrodynamic drag characteristics. This uniformity obviates directional drag reduction.

Boundary-layer-control ("BLC") has been investigated to attain high-lift on aircraft wings and to promote laminar, low friction, flow on wings and elongated bodies. But no such system has been proposed or applied to fluid-submersed bluff bodies to reduce pressure drag and VIV. Unlike aircraft wings, fluid-submersed hulls, such as SPARs, marine columns and risers, and semi-submersible drilling vessels, are generally large, bluff, unstreamlined vertical circular-cylindrical forms or non-circular and/or horizontal cylindrical forms.

The presence of high drag levels and VIV on SPARs, marine risers, and semisubmersible drilling vessels. Drag and VIV may prevent operation of such ocean-deployed vessels, at a high cost to drilling operations. Thus, the inability to substantially reduce drag and VIV may have high economic costs.

Accordingly, while various systems and methods exist for reducing VIV and hydrodynamic drag in fluid-submersible objects, no such system or method reduces both VIV and hydrodynamic drag to a substantial degree. Moreover, while BLC has been applied to streamlined aircraft wings to attain high-lift, BLC has not been designed or applied to fluidsubmersed hulls, such as SPARs, marine risers and columns, and semi-submersible drilling vessels. Accordingly, a need exists for a system and method for reducing VIV and hydrodynamic drag in fluid-submersed hulls and for thereby preventing suspension of drilling operations and other functions in the presence of currents in the fluid.

SUMMARY

The details of one or more embodiments of the invention are set forth in the accompanying drawings and the description below. Other features, objects, and advantages of the invention will be apparent from the description and drawings, and from the claims.

The present invention is a system for reducing the hydrodynamic drag and VIV on a bluff hull submersed at least partially in a fluid, such as water. The term "bluff hull," as used herein, means vertical and horizontal circular-cylindrical forms, vertical and horizontal elliptical-cylindrical and elliptical-semi-cylindrical forms, spherical forms, semi-rectangular forms with rounded comers, and other bodies that present a broad underwater profile against currents flowing in the water. The term "bluff hull" thus includes SPARs, marine risers, and pontoons and floatation bodies for semi-submersible drilling structures, all of which are generally deployed in the ocean, in which swift currents often travel that induce VIV and drag on a submersed bluff hull. The term "bluff hull," as used herein, also includes other types of bluff bodies that are at least partially submersed in fluid, including bridge and pier stanchions and footings, ship and boat hulls, submarines, underwater communication cables, and underwater tunnel exteriors, to cite some examples. This definition of the term "bluff hull" also makes clear that the invention can be applied not only to floating bodies, such as ships and SPARs, but also to bodies that anchored to the bottom of the fluid, such as bridge stanchions and marine risers. Also, the invention is useful in any fluid that experiences or conveys currents and other disturbances, but is especially useful in oceans, seas, lakes, and rivers, all of which may experience strong and swift currents.

In a first embodiment, the present invention is a system for reducing hydrodynamic drag and VIV of a bluff hull beset by a current. The system includes a bluff hull, designed to be at least partially submerged in an exterior fluid. The bluff hull has a hull interior and a hull surface. The hull surface has an up-current side and a down-current side, such that the up-current side may be beset by a current present in the exterior fluid. The system also includes at least one opening of the hull surface for passing an interior fluid out of the hull interior into the exterior fluid so as to reduce flow separation of the current on the downcurrent side of the hull surface.

In another embodiment, the invention is a system for reducing hydrodynamic drag and VIV in a bluff hull. The system includes a bluff hull, designed to be at least partially submerged in water. The bluff hull has a cavity for holding water and a hull surface. The hull surface has an up-current side and a down-current side, such that the up-current side may be beset by a current present in the water in which the bluff hull is at least partially submerged. The system also includes at least one nozzle in the hull surface for blowing water from the cavity out of the hull surface and into the exterior fluid at a velocity greater than the current velocity and at an angle substantially tangential to the hull surface at the location of the nozzle and substantially in the direction of the current, so as to reduce flow separation of the current on the down-current side of the hull surface.

DESCRIPTION OF DRAWINGS

FIG. 4A is a side-view of an exemplary embodiment of the system of the present invention.

FIG. 4B is a top-view of the embodiment of FIG. 4A along line B—B.

FIGS. 4C and 4D are top views of another exemplary embodiment of the system of the present invention showing a four slot-nozzle configuration.

FIG. 9A is a side-view of a marine riser in accordance with the present invention.

FIG. 9B is a cut-away view of the marine riser of FIG. 9A along line B—B.

FIG. 9C is an enlarged-partial-view of the cut-away view of FIG. 9B showing a slot-nozzle and valve.

FIG. 16 is a cross-section of a BLC-equipped body with a rectangular cross-section section and rounded corners, such as a horizontal pontoon used on a semi-submerged drilling vessel.

Like reference numbers and designations in the various drawings indicate like elements.

DETAILED DESCRIPTION

The present invention employs Boundary-Layer Control ("BLC") to reduce hydrodynamic drag and VIV oscillations in fluid-submersed objects, such as SPAR hulls, marine risers and columns, and sections of semi-submersible drilling vessels, that may be beset by ocean, river, or other currents.

As used herein, the term "fluid-submersible object" should not be considered limited to objects that are fully submersible in fluid (such as the ocean), but rather broad enough to encompass any object that is at least partially submersed in fluid. For example, a marine riser, like the riser 200 shown in FIG. 2, is completely submersed in the ocean, while SPAR 100 is only partially submersed. Moreover, as described in the Summary above, as used herein, the term "hull" should be considered to encompass many different forms and types of fluid-submersible objects, including vertical and horizontal circular-cylindrical forms, vertical and horizontal elliptical-cylindrical and elliptical-semi-cylindrical forms, spherical forms, and semi-rectangular forms with rounded corners, including SPARs, marine risers, pontoons and floatation bodies for semi-submersible drilling structures, bridge and pier footings and stanchions, submarines, and ship and boat hulls.

Though this invention may apply to hulls at least partially submersed in any fluid, the remainder of this description will refer, for convenience, to "water" as the fluid. This reference is not to be considered limiting on the invention.

FIGS. 4A and 4B are side-view and top-view, respectively, of an exemplary embodiment of the system of the present invention, showing a vertically aligned, circular-cylindrical hull 400 equipped with BLC of the present invention. The exemplary inventive system of FIG. 4 includes blowing slot-nozzles 402 disposed on the surface of the circular-cylindrical hull 400 symmetrically about a diameter aligned with the onset current flow direction 404. For convenience, the term "slot-nozzle" will be used for the remainder of the description, meaning that the nozzle is an elongated slot along the surface of a hull. It will be recognized, however, that any type of opening or outlet in the surface of a hull that introduces high energy fluid in the direction of the flow of current and adjacent to the hull surface can be used to accomplish BLC in accordance with the invention. For example, the openings may be multiple point-nozzles, linear or slot nozzles, water-jet outlets, or any other opening through which fluid may be expelled from the hull surface into the surrounding fluid. Preferably, however, the opening is a slot nozzle, which accelerates the velocity of the exiting fluid.

Figure 1A:
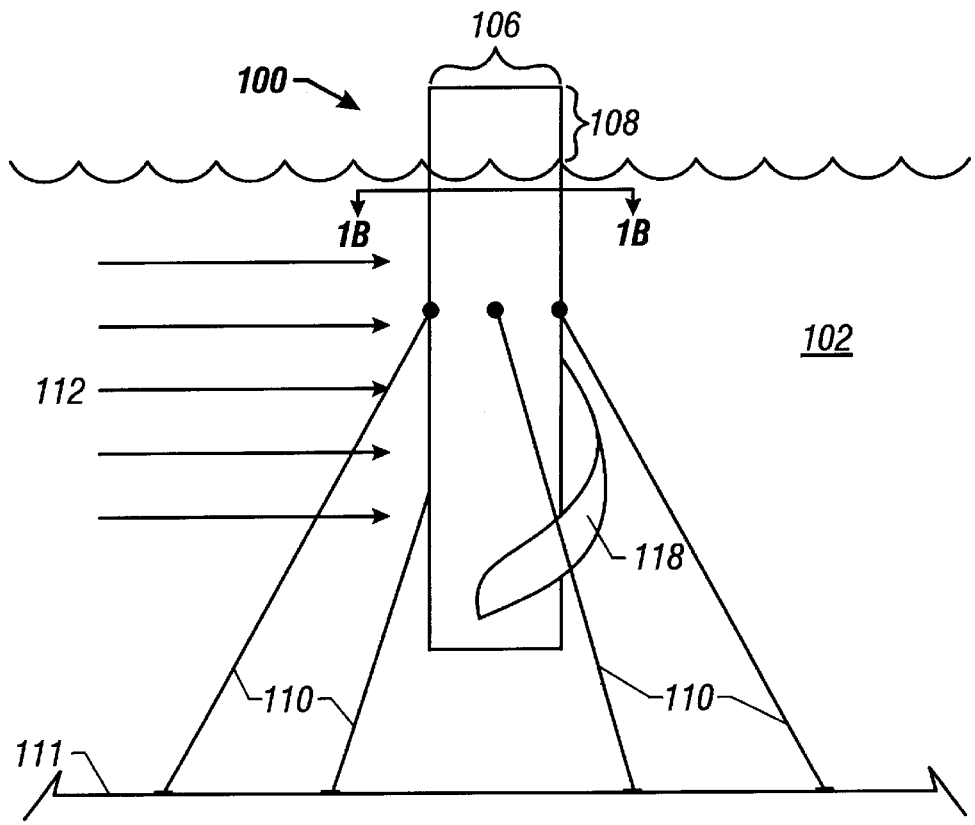
FIG. 1A is a side-view of a SPAR with prior art strakes.

As shown in FIG. 1A, absent BLC the water in the boundary layer is retarded by friction and thus lacks the kinetic energy characteristic of the flow external to the boundary layer at the same angular position and is therefore subject to back-flow and separation in the face of inevitable adverse pressure gradients, such as gradient 114. In the exemplary BLC system of FIG. 4A, the blowing slot nozzles 402 effect high-speed injection of water into the retarded boundary layer of the external current flow about cylindrical hull 400. The nozzles 402 blow more energetic water flow 406 into the boundary-layer in a current-wise A direction generally tangential to the cylindrical surface of the hull 400 at an angular location generally up-current of the location of untreated boundary layer separation. To feed the nozzles 402, water collected at a remote location or locations is passed through low-head, high-volume pumps to provide the higher energy water flow to the blowing locations. Alternatively, the energization of boundary layer flow by blowing may be augmented at other up-current locations by suction into a hull of retarded boundary layer flow, which suction may provide part or all of the supply of water for blowing.

Together (or separately) the boundary layer blowing and suction actions prevent separation of the current flow from the surface of the cylindrical hull (like the separation shown in FIG. 1B) at most locations downstream or aft of the diameter perpendicular to the direction of onset current. This causes the external current flow to be disposed more nearly like an ideal frictionless flow in its general pressure distribution properties, as shown in FIG. 4B; with associated small form drag. Absent separated flow, alternating vortex shedding, with its consequent induced lateral oscillation of the hull (or VIV, is also minimized.

The BLC system can be used not only to reduce drag and VIV, but also to propel the hull 400 through the surrounding water, i.e., to dynamically position the hull 400. The nozzles 402 can be selectively activated and deactivated so as to blow water in a direction substantially opposite to the desired direction of travel. This allows elimination of towing vessels, and on-board motors and screws, which are traditionally used to move such hulls. Moreover, the BLC system can be used to correct hull tilt by high-low opposed blowing on the hull 400.

Figure 5A:
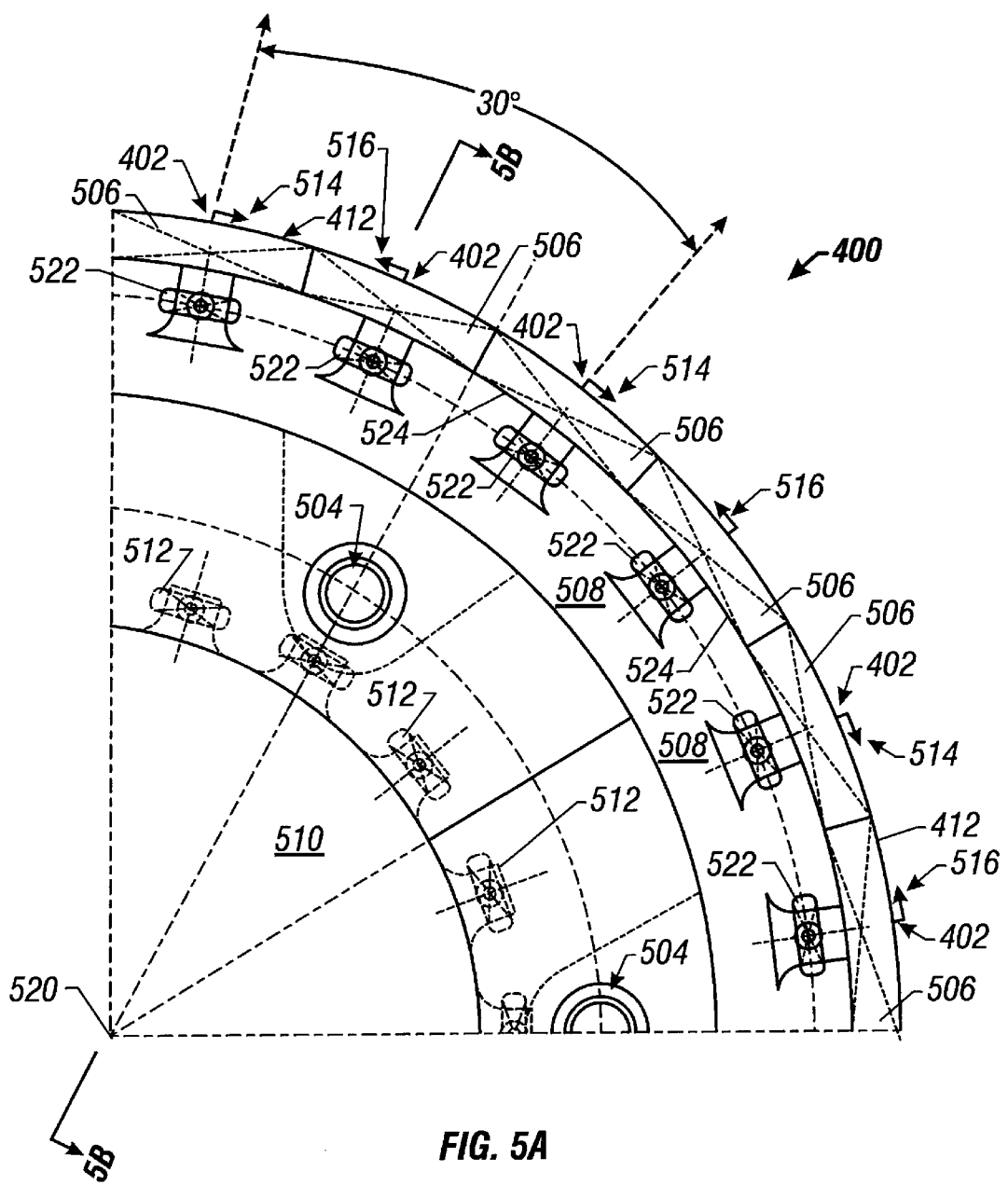
FIG. 5A is a quarter-plan cut-away view at the pumproom level of a hull in accordance with the present invention.
Figure 5B:
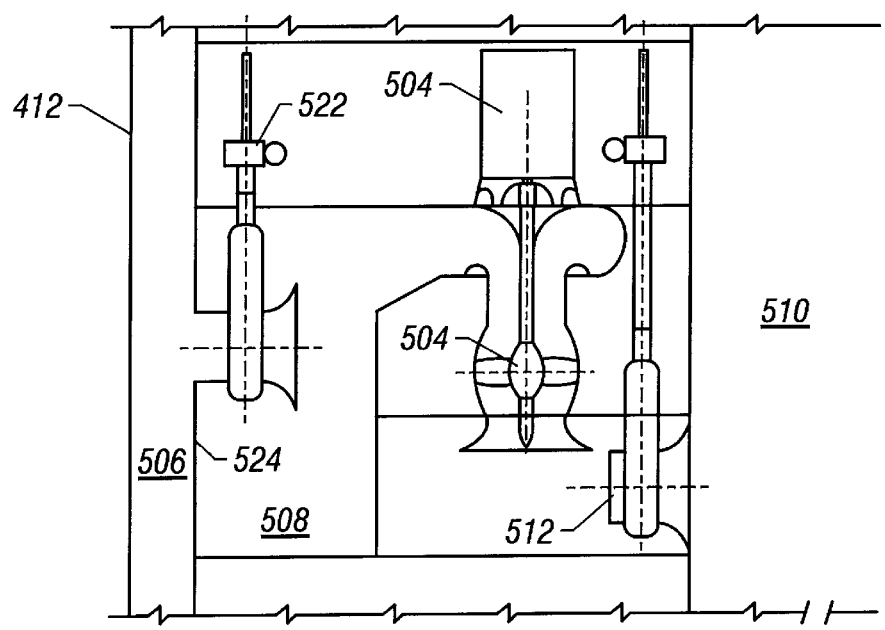
FIG. 5B is a cut-away elevation-view along lines A—A of FIG. 5A.

As described above and shown in FIG. 4, boundary layer energization is accomplished through blowing nozzle-slots 402 imbedded in attached to the surface 412 of hull 400. Preferably, and as shown in FIGS. 4A, 5A, and 5B, the nozzle-slots 402 are arranged vertically, coincident with geometrical generator lines of the cylindrical hull surface 412, and generally perpendicular to the local components of the onset current velocities 404. Water is passed through, preferably, low-head, high-volume pumps 504 to the slots 402. The slots 402 are preferably flush with the hull surface 412 and open immediately and continuously into adjacent parallel conduits 506. The conduits 506 have cross-sectional areas much larger than that of the blowing slots 402, per unit slot length, and serve to distribute the blowing-water flow from a supply manifold 508 conveniently located along the vertical length of the slots 402.

The manifold 508 may be supplied by a pumping system that takes suction from the sea in the "moon pool" 510 of the hull 400, or from another convenient location. The pressurized water flow is accelerated through the slot-nozzles 402 to discharge externally in a direction tangential to the local hull surface 412 and in the same direction as that of the local external current flow, as shown by reference numerals 406 and 404 in FIGS. 4A and 4B. The blowing water exits the slot-nozzles 402 at generally the pressure of the local external flow at the nozzle location, but with a velocity adequately greater than that of the local external flow so as to energize the retarded boundary layer flow and thereby prevent flow separation. Preferably, the blowing slot-nozzles 402 lie within the external contour of the hull surface 412 to avoid being damaged by the impact of water-borne objects. Blowing water may be filtered at sea suction inlet plenums 512 to exclude waterborne particles of a size greater than the minimum blowing-slot opening.

In angular progression around the hull 400, clockwise-514 and counter-clockwise-516 directed slot-nozzles 402 are preferably alternated, with a total population of 24 in intervals of 15 degrees being the preferred configuration. An adjacent pair of like-handed blowing slot-nozzles 402 will therefore be separated by approximately 30 degrees in polar coordinates (as shown by reference numeral 518), centered on the center line 520 of the cylindrical hull 400, as seen in any plane cross-section of the hull 400 that is perpendicular to the center line. If dictated by the principles of flow physics, such blowing slots 402 may instead be separated by approximately $1/12$ of the circumference of the hull surface 412. Two such blowing slots, those located farthest up-current, will preferably each be placed at approximately 15 degrees (or $1/24$ of the circumference of the hull surface 412) down-current of the opposite extremes of the diameter that lies nominally perpendicular to the onset water current direction. As dictated by flow physics and economics, combinations of blowing slots 402 may be replicated at locations yet further down-current, even with different spacings, in order to further prevent flow separation from the hull 400 and the accompanying hydrodynamic drag and VIV-oscillations.

On a cylindrical hull or pontoon with a horizontal axis, the (elevation) angle of current incidence is approximately fixed at zero. In that case as few as four blowing slot-nozzles may suffice, as shown in FIGS. 4C and 4D.

In an alternative embodiment, blowing slots may precede suction slots (such as inlet plenum 512) in the flow-wise direction, or several suction slots may be grouped together at appropriate spacings and be preceded or followed by several blowing slots similarly grouped together. It will also be appreciated that, as dictated by flow physics and/or economy, BLC on a cylindrical hull may be accomplished by suction slots only, with blowing discharge employed for propulsion thrust through discrete or continuous nozzles, or by slot-blowing means alone with supply flow being supplied independently, or by any useful combination of such means.

The vertically lengthwise extent of any blowing or suction slot and associated conduits, pairs of such slots and conduits, or sets of such slots and conduits, may cover the entire length or height, or any fraction of the length or height, of the hull, or some multiple of hull diameter, as dictated by flow physics and/or economics. Therefore, BLC systems may be contiguously replicated over the submerged vertical height of a hull, from the water line to the hull bottom. These systems may be independent or interconnected as dictated by considerations of control, safety, economics, and redundancy requirements.

A "BLC system" always includes an opening in the hull surface through which fluid is expelled into the surrounding water. A BLC system preferably includes a plurality of slot nozzles discharging fluid into a current stream of fluid outside the hull surface in a direction substantially tangential to the hull surface and substantially parallel to the outside current stream. This discharged fluid energizes a boundary layer in the fluid immediately adjacent the hull surface in order to prevent subsequent separation of the current stream from the hull surface. The BLC system may also include a plurality of contiguous conduits internal to the hull surface that supply by pressurized fluid to the nozzles and that are supplied with pressurized fluid from pumps or other convenient pressurized fluid source via appropriate piping and distributing manifolds. The BLC system may also include filters that filter the fluid supply to the pumps drawn from the body of fluid external to the hull. The fluid supply may either be directly directly supplied to the pumps or may be supplied through boundary layer suction inlets on the hull surface. The BLC system may also include a computer-control system that is coupled to a sensing system located on the outer surface of the hull for the purpose of determining the direction and strength of the onsetting current stream and electronically controlling the selection and opening or closing of the nozzles required to energize the boundary layers and avoid flow separation in the most economical and effective manner.

The hull 400 may be rotatably-configured so that it always presents the same aspect to the onset water current 404, without regard for the geographic direction of the current 404. For example, the hull 400 shown in FIG. 4 has two sets of vertically-aligned slots 402 located on opposite sides of the circular-cylindrical hull 400. Assuming the hull 400 can be rotated about its vertical axis 408, if the direction of the current 404 changes, the hull 400 can thus be moved so that the two sets of slots 402 are always aligned at approximately a 90 degree angle 410 relative to the onset current 404. Moreover, the slots 402 would each discharge in a down-current direction generally tangentially to the hull surface 412 in which they may be imbedded. A rotatable hull 400 permits fewer sets of vertically-aligned slots 402, because the hull 400 can always be rotated to optimally align the slots 402 to the current 404. If, however, hull rotations are to be limited to ninety degrees in either direction, then two pair of blowing slot-nozzles 402 should be provided, at a minimum. The two pairs will be arrayed in selectably clockwise and anti-clockwise blowing pairs located at the extremes of the perpendicular diameter.

Alternatively, if the hull 400 cannot be rotated about its vertical axis in order to always present the same aspect to the onset water current 404, then the configuration of the BLC system will be selected to align it for best drag and VIV reduction. One method for accomplishing this goal is to fit the hull with an adequate number of vertically-aligned blowing and/or suction slots (assuming the hull is vertically oriented, such as hull 400), with the slots spaced equally around the periphery of the hull to allow BLC configuration by selective activation of appropriately located blowing and/or suction units. An example of this configuration is shown in FIGS. 5A AND 5B, in which the slots 402 are spaced around the hull 400 in equally-spaced increments of 15 degrees. Note that, in FIGS. 5A AND 5B, the blowing slots 402 are doubly represented because water blowing in either clockwise 514 or anti-clockwise 516 tangential directions may be required at any particular angular location.

Figure 5C:
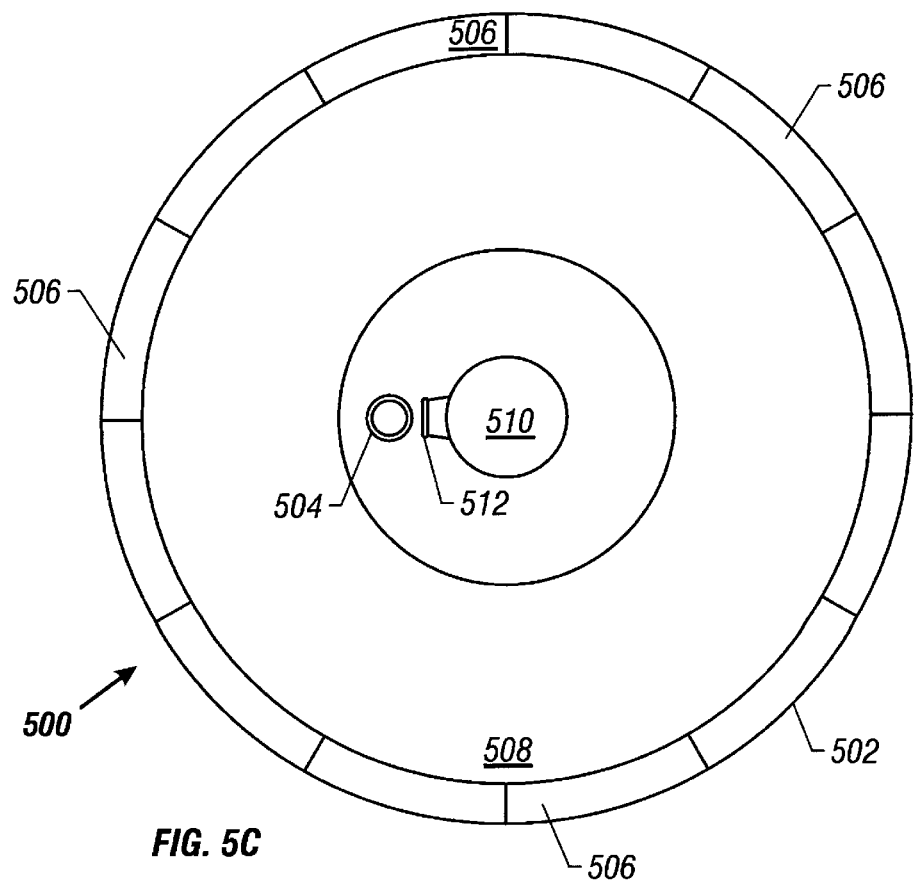
FIG. 5C is a cross-sectional view of the hull of FIG. 5A parallel to the water plane.

The blowing and/or suction manifolds 508 will preferably take the form of rings, as shown in FIG. 5C, which is a cross-sectional view of the hull 400 parallel to the water plane. Such a ring blowing manifold 508 will communicate with each proximate blowing conduit 506 through a remotely operated valve 522. Similarly, such a ring suction manifold 508 will communicate with each proximate suction conduit (not shown) through a remotely operated valve, like valve 522. A computer controlled algorithm can be used to select the set of blowing and/or suction slots that will most symmetrically accommodate the onset current flow. The algorithm can also be designed to set the BLC system, as assembled, into operation to most economically and effectively reduce hydrodynamic drag and VIV.

Figure 2A:
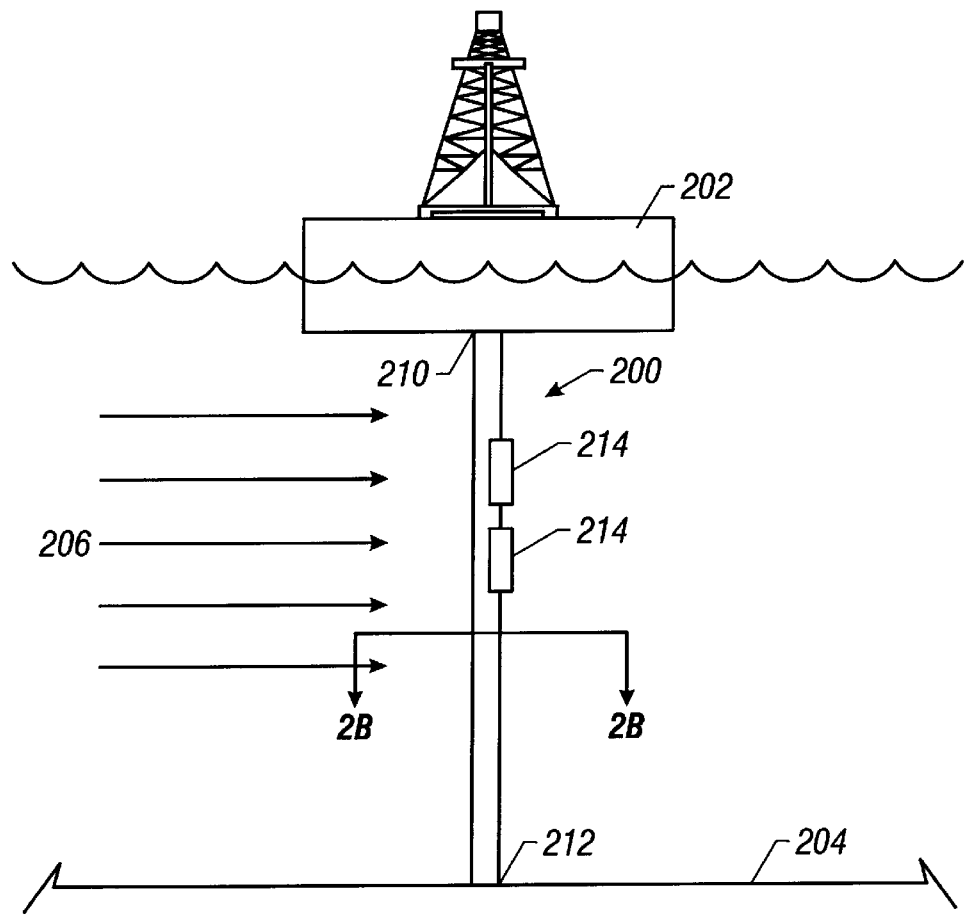
FIG. 2A is a side-view of a marine riser with prior art fairings.
Figure 2B:
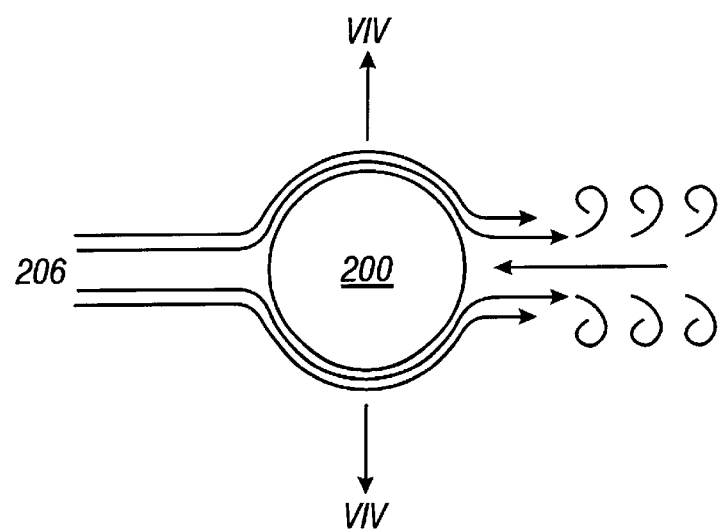
FIG. 2B is a top-view of the marine riser of FIG. 2A along line B—B.
Figure 3A:
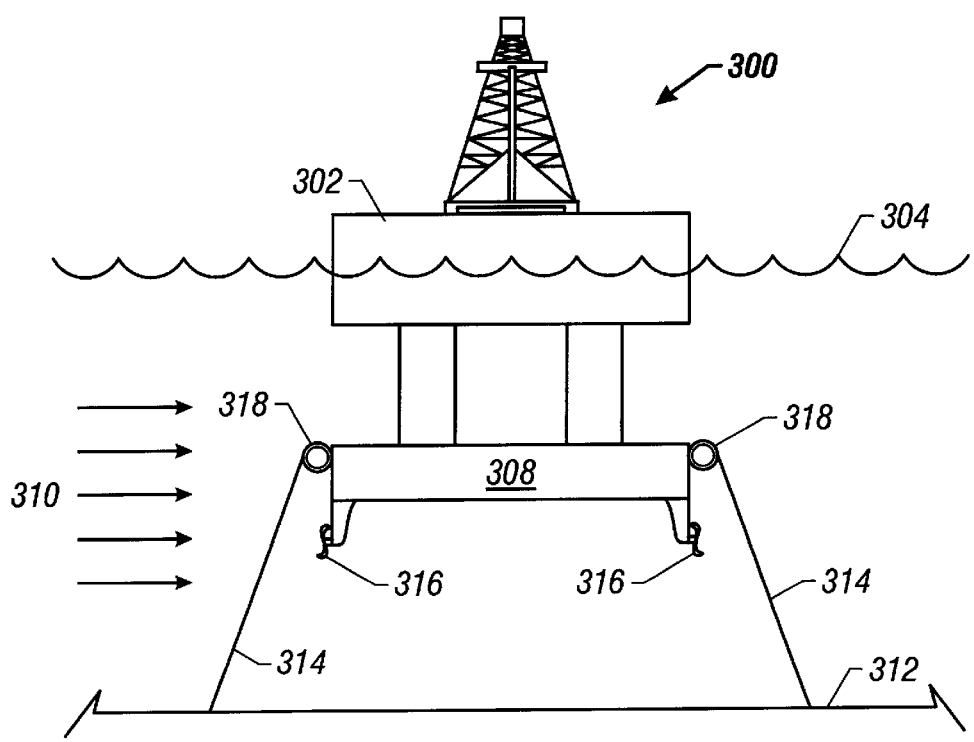
FIG. 3A is a side-view of a semi-submersible drilling vessel.
Figure 3B:
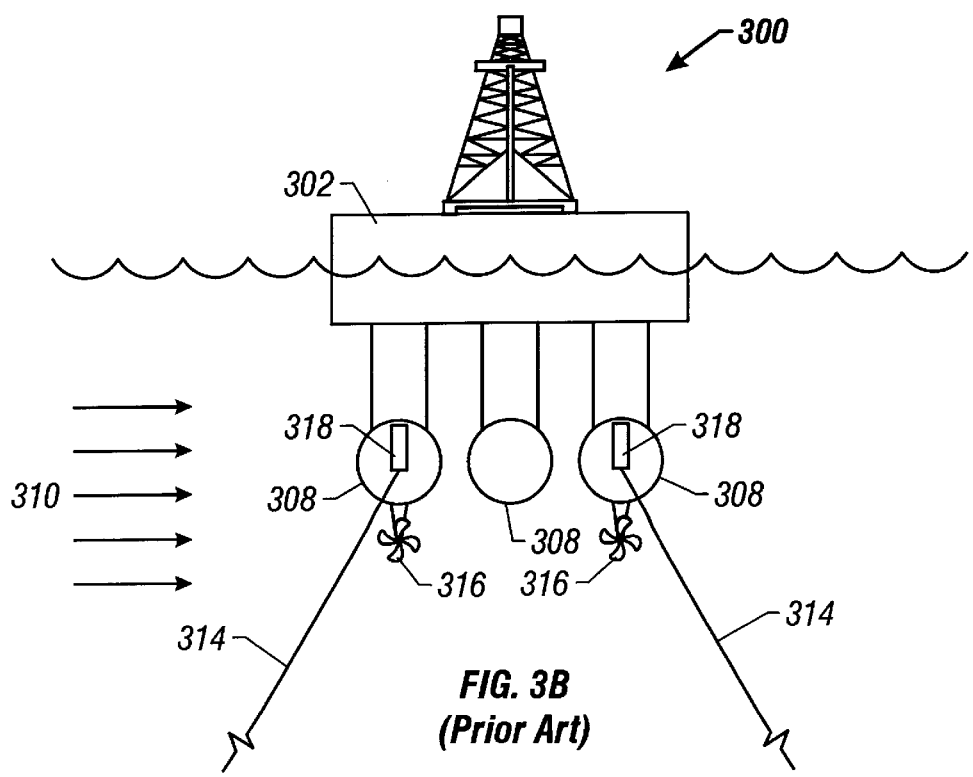
FIG. 3B is an end-view of the semi-submersible drilling vessel of FIG. 3A.

In the case of a marine riser structure, such as that shown in FIGS. 2A AND 2B, it is preferred that the selector valves 522 be integral with the blowing-slot-nozzles 402, which will preferably be remotely controllable. This arrangement allows all of the conduits 506 to be used to transport blowing-water from the top of the riser stack downward.

Figure 1B:
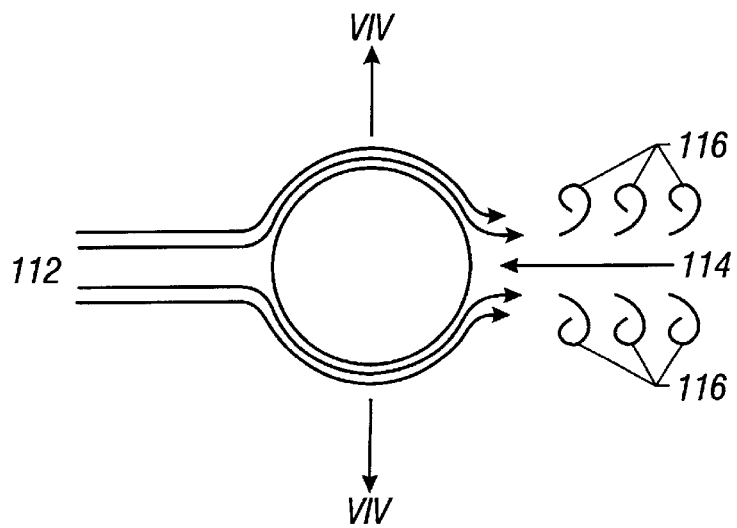
FIG. 1B is a top-view of the SPAR of FIG. 1B along line B—B.

Over the draft of a SPAR vessel, such as that shown in FIGS. 1A and 1B, the vertical length of the SPAR 100 may exceed 600 feet, potentially resulting in considerable variation in the velocity of an onset current along the SPAR's vertical length. Maximum current velocities occur at the surface and continue strong to depths of approximately 200 feet, beyond which the current velocity is found to decrease sharply and then to attenuate more slowly in greater depths. As the required velocity and volume of BLC water-blowing is markedly dependent upon the velocity of the onset current, economy may dictate that the water-blowing system be segregated into two parts: one at a typically higher blowing-slot velocity and volume-per-unit length, serving shallower areas of the submerged hull, and another at a typically lower blowing-slot velocity and volume, serving the deeper areas of the hull. For example, assuming hull 400 were a several hundred foot long SPAR, the top two sets of blowing slots 402 could be set to expel water at a higher velocity than the three lower sets of blowing slots 402. Such a configuration would require a replication of blowing-water ring manifolds 508, one for the two higher sets of slots and their higher blowing-water pressure, and another for three lower sets and their lower blowing-water pressure.

If multiple velocity blowing slots are employed, some of the pumps 504 will discharge to the high head manifold and be designed and operated to provide such head and flow as appropriate, while the remainder of the pumps 504 will discharge to the lower head manifold for lower velocity flow. Each blowing-slot 402 will be separated into independent upper and lower parts at approximately 200 feet depth location, and each such part will be supplied by a separate vertically running conduit 506. The two-fold set of conduits 506 will be controllably connected through a two-fold set of remotely operated valves 522 to the high-and low-head supply manifolds. Pump suction, however, may remain common. All vertically running conduits 506 may be formed between radial-vertical partitions extending between concentric inner hull skin 524 and outer hull skin 412.

Alternatively, and preferably with a BLC-equipped marine riser, one pumping system and manifold would be retained, but the vertical supply conduits may be fitted with chokes at appropriate depths to apportion and limit the blowing-water flow proceeding downward. Slot-nozzle throat areas may also be reduced with increasing depth position.

A computerized control system (not shown), coupled to electro-mechanical devices, such as valves 522 and pumps 504, may be used to control the BLC system. Input signals to the control system relaying current strength and relative direction may be generated manually, by remote sensors (not shown), or by an array of pressure transducers around the circumference of the hull 500. In a preferred automated control system, the depth of BLC-equipped hull would be divided into zones, each of which would be monitored by a ring array of hull surface pressure transducers and controlled by a submerged battery powered general purpose or custom, dedicated computer. A pattern recognition algorithm applied to the pressure distribution would provide an estimate of relative current direction and magnitude, in known fashion. Each computer would translate such information to select the particular blowing slot-nozzle pairs to activate in their zones and collectively to demand pump speed.

Figure 6A:
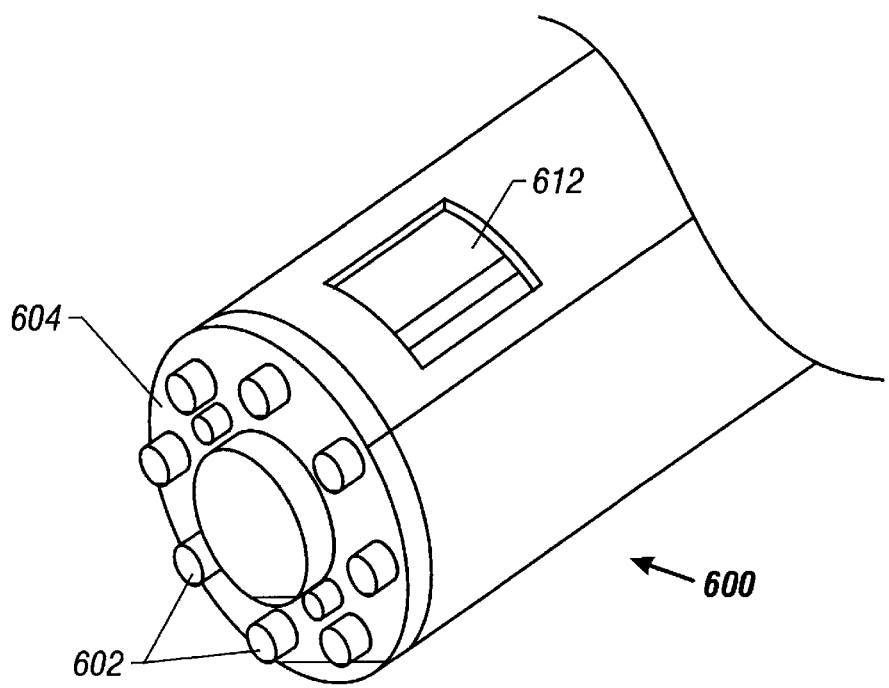
FIG. 6A is a perspective-end-view of an upper marine riser joint in accordance with the present invention.
Figure 6B:
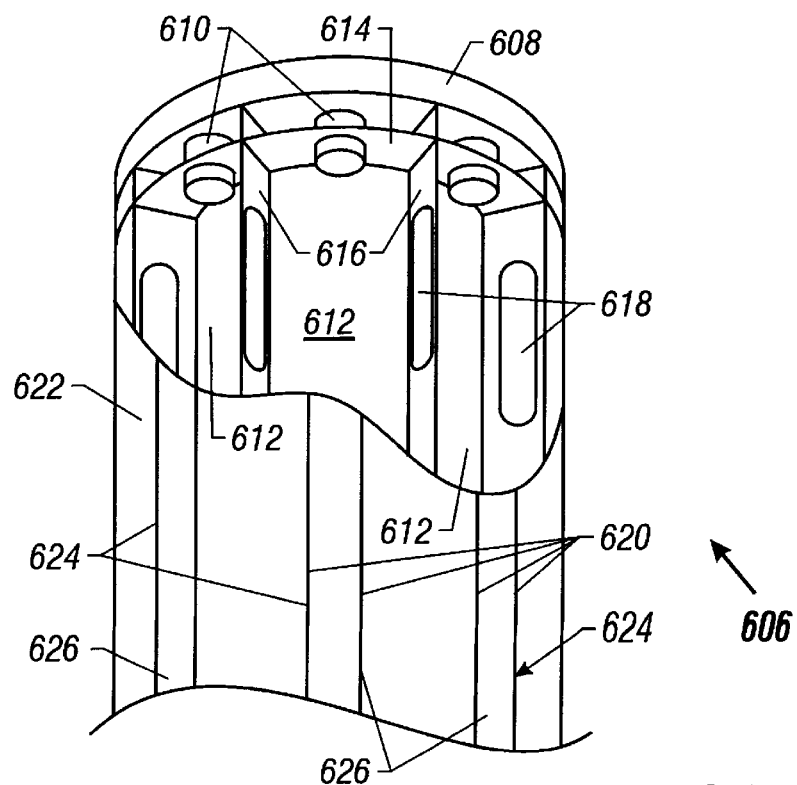
FIG. 6B is a cut-away perspective-end-view of a lower marine riser joint, in accordance with the present invention, that can be coupled to the upper marine riser joint of FIG. 6B.

FIG. 6A shows the end of an upper marine riser joint 600 equipped with a BLC system in accordance with the present invention. A plurality of stub "pin" tubes 602 pierces a lower coupling flange 604 of the upper riser joint 600 and preferably protrudes below the flange 604 approximately 8 inches. The stub tubes 602 bear o-rings in suitable grooves for making the subsequent pipe connection pressure-tight, in known fashion. As shown in FIG. 6B, which is a cut-away view of a lower riser joint 606 that can be mated to the upper riser joint 600, a mating upper coupling flange 608 is pierced by a plurality of "box" tubes 610 whose inner diameter is slightly larger than the outer diameter of the mating pin tubes 602. When "stabbed" together, the box tubes 610 and pin tubes 602 form pressure-tight connections between corresponding BLC conduits 612 of the upper riser joint 600 and lower riser joint 606.

A plurality of such pin/box tube connections may be arranged in a ring whose radius is approximately equal to the mean radius of the BLC conduits 612. These pin/box tube connections are similar in most respects to those of a choke line 916 and a kill line 918, both of which also pass through the riser coupling flanges, but at a smaller radius than the pin/box tube connections. The choke line 916 and kill line 918 will be described below in connection with FIG. 9B.

A pin tube 602 of the upper riser joint 600 extends above the lower flange 604 a short distance to where it is permanently (or removably) joined to and through a lower end plate (not shown) of a BLC conduit 612. Similarly, a box tube 610 of the lower riser joint 606 extends below the upper flange 608 a short distance to where it is permanently (or removably) joined to and through the upper end plate 614 of a BLC conduit 612. When the riser coupling flanges 604, 608 are connected together, the stabbed-together pin tubes 602 and box tubes 610 each hydraulically connect a single BLC conduit 612 of an upper riser joint 600 to a single BLC conduit 612 of a lower riser joint 606. A plurality of such connections forms separate, parallel connections between all of the BLC conduits 612 of an upper riser joint 600 and all of the BLC conduits 612 of a mating lower riser joint 606.

The mating coupling flanges 604, 608 are held and forced together to form a preferably rigid connection between adjacent riser joints 600, 606, preferably by an external clamp (not shown). The clamp is located exterior to the flanges 604, 608 and to all BLC conduits 612, buoyancy material, and wiring that may be surrounding the riser pipe.

At a vertical location a short distance above the lower end plates 614 of the BLC conduits 612 of the lower riser joint 606, radial-vertical partitions 616 that separate adjacent conduits 612 are preferably laterally pierced 618 to allow and ensure equalization of the pressure and blowing-water flow quantity conducted by each of the connected box tubes 610, by means of cross-flow among them. Similarly, at a vertical location a short distance below the upper end plates 614 of the BLC conduits 612 of the lower riser joint 606, the partitions 616 are laterally pierced 618 to allow and ensure equalization of the pressures and flow quantities conducted among the conduits 612 below.

At selected locations of riser joint connections, one or several of the connecting tubes 602, 610 may be blanked or choked in order to reduce the flow rate proceeding below. This may be done to match, more closely and more economically, the resulting jet velocity and flow rate to the generally decreasing current velocity found with increasing depth location.

Preferably, slot-nozzles 620 are provided that are of a length slightly less than the length between flanges of a riser pipe joint. These slot-nozzles 620, when opened, communicate between their associated conduits 612 and the sea surrounding the riser 606. In cross section, when opened, these slot-nozzles 620 have the general configuration of converging nozzles that discharge the blowing-water at high velocity in a direction generally tangential to the external, circular-cylindrical surface 622 of the riser 606.

Adjacent slot-nozzles 620 are configured to discharge alternately in the clockwise 624 and counter-clockwise 626 directions, sequentially. Preferably, the spacing of like-direction discharging slot-nozzles 620 is nominally 30 degrees in angular position. The angular spacing of slot-nozzles 620 is thus, preferably, nominally 15 degrees. In consequence, the preferable configuration has 24 slot-nozzles 620 equally spaced about the external circumference of the riser structure 606, including 12 slot-nozzles 620 discharging in a tangentially clockwise direction 624, uniformly and alternatingly interspersed with 12 slot-nozzles 620 discharging in a tangentially counter-clockwise direction 626. All such slot-nozzles 620 extend between the terminating end plates 616 of their proximate, associated water conduits 612. In the preferred embodiment, the slot-nozzles 620 are generally closed, preventing water discharge until deliberately and selectively opened.

Figure 7A:
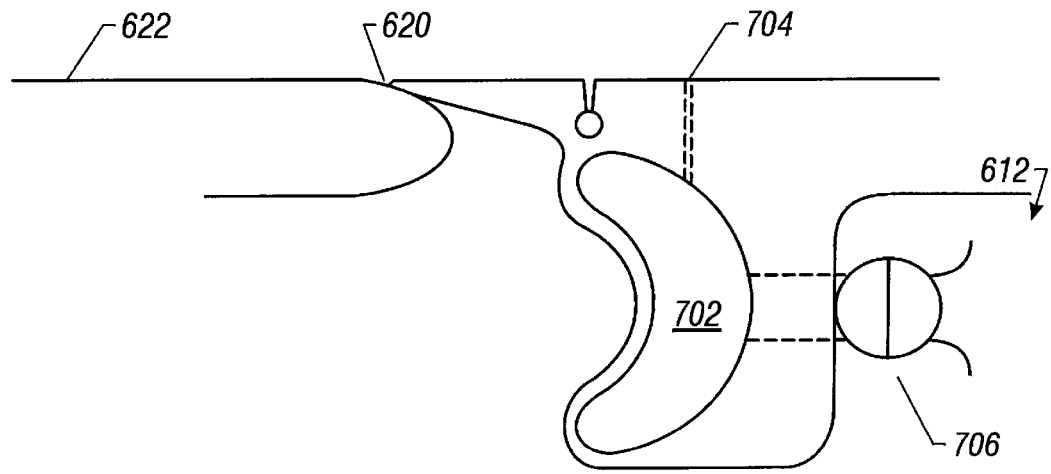
FIG. 7A is a side-view of an exemplary embodiment that allows selective opening and closing of slot-nozzles, showing the slot-nozzle in a closed position.
Figure 7B:
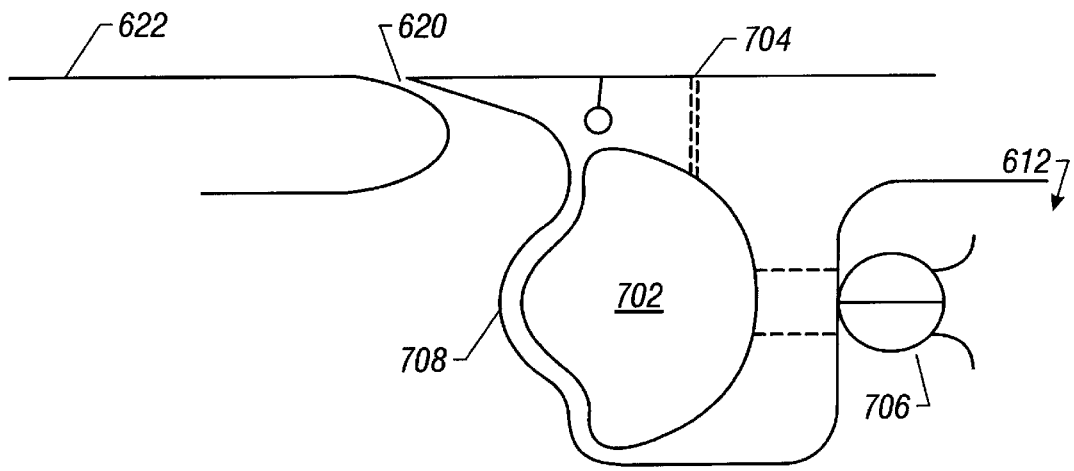
FIG. 7B is a side-view of the slot-nozzle of FIG. 7A in an open position.
Figure 8D:
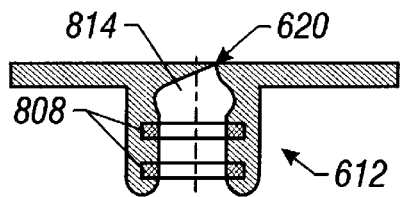
FIGS. 8A–8H show another embodiment that allows selective opening and closing slots-nozzles.
Figure 8B:
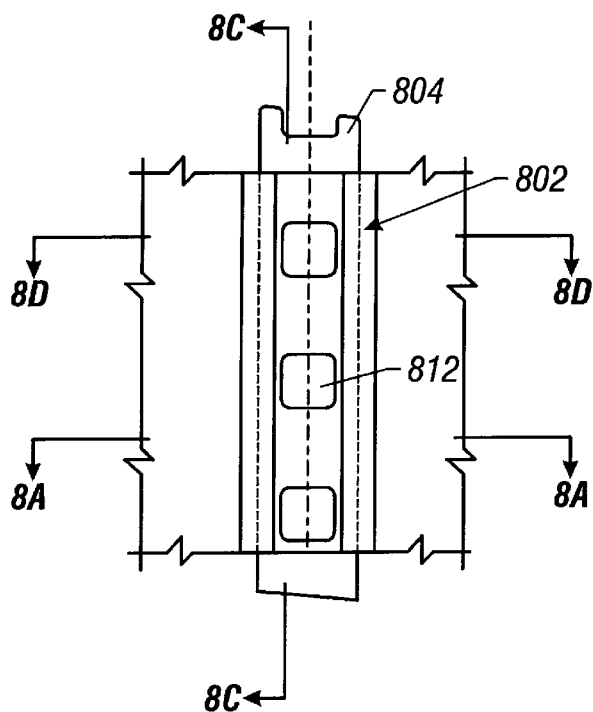
Figure 8C:
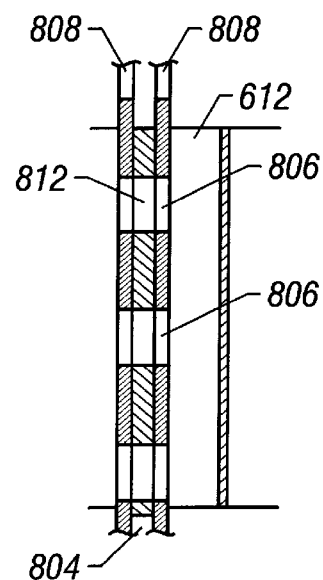
Figure 8A:
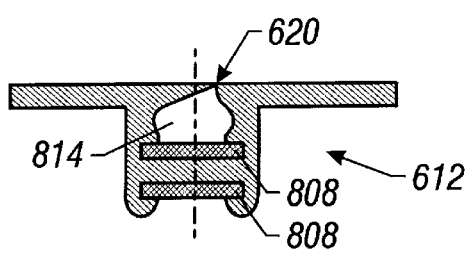
Figure 8H:
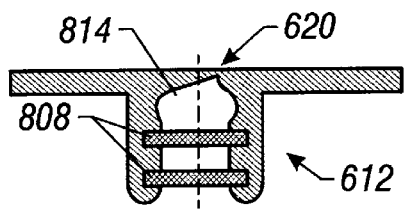
Figure 8F:
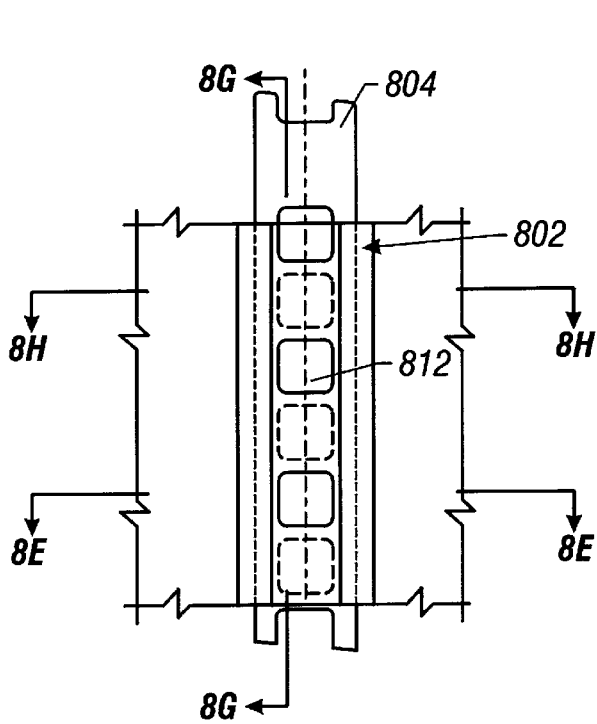
Figure 8G:
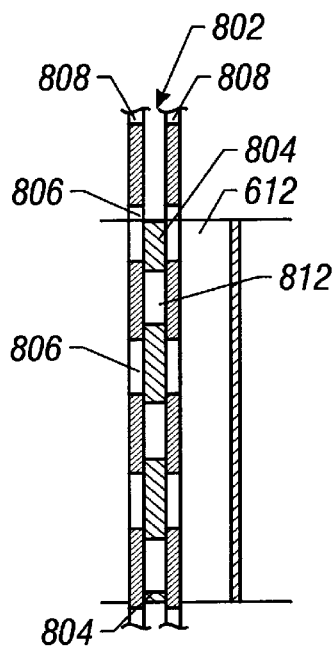
Figure 8E:
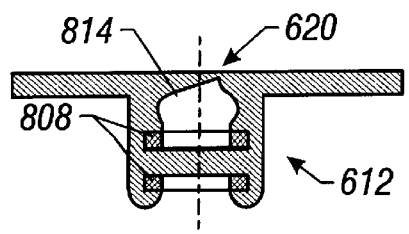

An embodiment that permits selective opening of slot-nozzles 620 is shown in FIGS. 7A and 7B. In this embodiment, slot-nozzles 620 have adjacent, substantially parallel, elongated compartments 702 that are kidney-shaped in cross-section. These parallel compartments 702 are normally vented to the sea through one or more small holes 704 at the ends of the compartments 702. When, by means of a remotely operated valve 706, the substantially parallel compartments 702 are opened to the pressurized water in the adjacent blowing-water conduit 612, the cross-section of the compartments 702 becomes more rounded, as shown by reference numeral 708. This distortion of the adjacent parallel compartment 702 causes the slot 620 to open, as shown in FIG. 7B, releasing a high-velocity wall-jet of water into the sea in a direction substantially tangential to the hull surface 622. Therefore, by selection of the valve 706 to open between selected parallel compartment 702 and blowing-water conduit 612, and by opening the valve 706, the immediately adjacent slot-nozzle 620 is opened, and the selected blowing-water jet is activated. While the control valve 706 is active, a small flow of high pressure water leaks from the vent holes 704, from parallel compartment 702 to sea. Preferably, the leakage flow is supplied by the control valve 706 at a pressure nominally equal to that of the water in the conduit 612.

Conversely, when a selected open control valve 706 is closed by remote action, the small flow of high pressure water is terminated, and, by leakage through the bleed hole 704, the pressure in the parallel control compartment 702 is promptly reduced to sea pressure. With this pressure equalization, the shape of the control compartment 702 cross-section returns to its kidney-shaped form of FIG. 7A because of the elasticity of the plastic material of which it is preferably formed. This return to the kidney shape causes the adjacent slot-nozzle 620 to close, as shown in FIG. 7A.

Alternatively, a normally open slot-nozzle 620 may be kept closed by the pressurized inflation of an adjacent parallel control compartment 702 of suitably shaped cross-section. The selective opening of a slot-nozzle 620 so configured is caused by the closure of its associated control valve 706, which cuts off the inflating flow from, and communication with, the high pressure water in the proximate supply conduit 612. Preferably, however, the slot-nozzle 620 is kept normally closed in the absence of selected control valve 706 opening, and, due to the elasticity of the compartment 702, the control valve 706 resists the internal pressure of the water in the supply conduit 612.

FIGS. 8A–8H show an alternative configuration of a slot-nozzle 620 with associated valve. A linear valve 802 separates the slot-nozzle 620 from the proximate blowing-water conduit 612, the valve 802 being formed by a perforated plate-strip 804 that is slideably connected to a matching multiplicity of ports 806 in the stationary body 808 of the valve 802. The shape of the port-perforations 812 in the valve slide 804 matches that of the ports 806 in the valve body 808 except for a small reduction in the lengthwise aperture extent of the prot perforations 812. When the valve slide 804 is positioned to align the port apertures 812 with those of the valve body 808, as shown in FIGS. 8A–8D, the adjacent selected slot-nozzle 620 is opened against its elastic constraint by the pressure of the then-communicated blowing-water, and the slot-nozzle 620 is activated. When the valve slide 804 is moved longitudinally by approximately one-half the pitch of the port spacing, the flow of blowing-water is cut off, the pressure of the water in the ante-chamber 808 of the slot-nozzle 620 drops promptly to the sea pressure, and the slot nozzle 620 closes by reason of its elasticity, as shown in FIGS. 8E–8H.

The lengthwise positioning of the valve slide 804 may be effected by a water-powered movable piston in a cylinder (not shown) that makes use of the pressure difference between the blowing-water in the supply conduit 612 and that of the surrounding sea. The pressurized water may be admitted to the actuating cylinder by a remotely actuated valve in the manner described above, and, when the valve is subsequently closed, it will allow reverse motion of the piston and connected valve slide by a spring while cylinder water is vented to the sea via a small bleed hole.

FIGS. 9A–9C show other features of a marine riser 900. At or near the waterline 902, below the sliding joint (not shown) at the top of the riser stack, a ring manifold 508 may be clamped to a flanged connection between two riser joints. Alternatively, and preferably, such a ring manifold 508 will form the lower part of a special riser pup-joint. This ring manifold 508 on its lower side exhibits a plurality of stub pin pipes 604 that are stabbed into a matching plurality of box tubes 610 that, in turn, penetrate the upper end plates of the BLC conduits 612 of the uppermost riser joint to which the BLC system is applied. All of the blowing-water supplied to the BLC system for the entire riser passes through this ringmanifold 508. One or more flexible water feed pipes or hoses 904 are connected to and through the upper side of the ring manifold 508. The feed pipes or hoses 904 extend upward to a deck of the drilling platform (not shown) where they are distally connected to the pump or pumps that supply the pressurized slot-blowing water serving the entire BLC system of the riser 900.

As can be seen in FIG. 9B, which is a cut-away along line B—B of FIG. 9A, the riser 900 includes several blowing-water conduits 612 arranged peripherally about the outside of the riser 900. FIG. 9B also shows a pair of blowing slot-nozzles 620, arranged to blow water substantially tangentially to the riser's surface 622 and in the onset direction of current 906. The riser 900 also includes buoyancy material 908, arranged in a ring centered about the longitudinal axis of the riser 900, with a riser pipe 910 being arranged in a ring inside the buoyancy material 908. In addition, a ring-shaped passage 912 to carry drilling mud is arranged in a ring shape within the the riser pipe 910, and a drill string 914 is located at the center of the riser 900. As noted above, the riser 900 may also include the choke line 916 and the kill line 918, in known fashion.

FIG. 9C is a blow-up of FIG. 9B, showing a cross-section of a slot-nozzle 620 with a linear valve 920 that controls the flow of water to the slot-nozzle 620. The slot-nozzle nozzel 620 opens to the sea to deliver high-velocity water in a direction substantially tangential to the hull surface 622 when the valve 920 is open to the blowing-water conduit 612.

Figure 10:
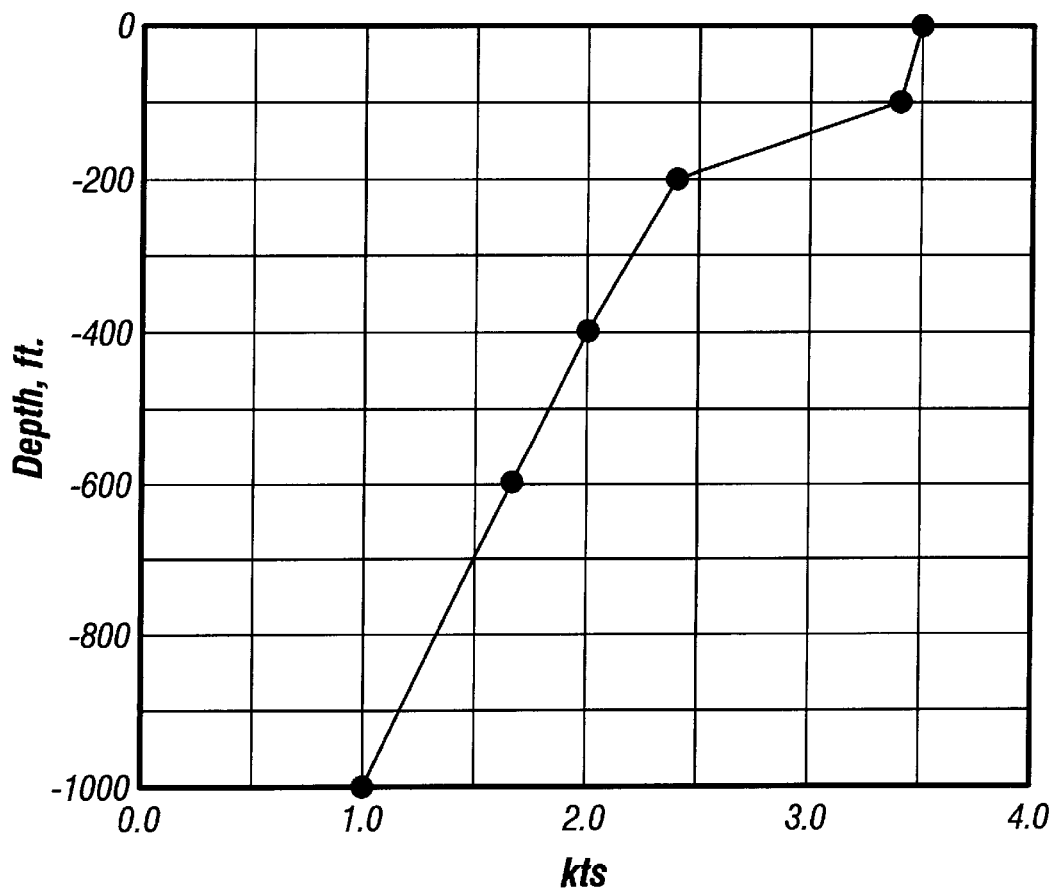
FIG. 10 is a plot of the distribution over depth of the velocity associated with a once-in-10 years occurrence loop current in the Gulf of Mexico.

FIG. 10 is a plot of the distribution over depth of the velocity associated with a once-in-10 years-occurrence loop current in the Gulf of Mexico. The maximum current occurs at the surface of the sea and exhibits about 3.5 kts. velocity. This extreme current and its variation with depth defines the environmental threat to the offshore structures that the drag and VIV-reducing BLC system of the present invention is designed to overcome. Significant is the bimodal nature of the current velocity distribution where the greatest velocities are found above 200 feet depth.

Figure 11:
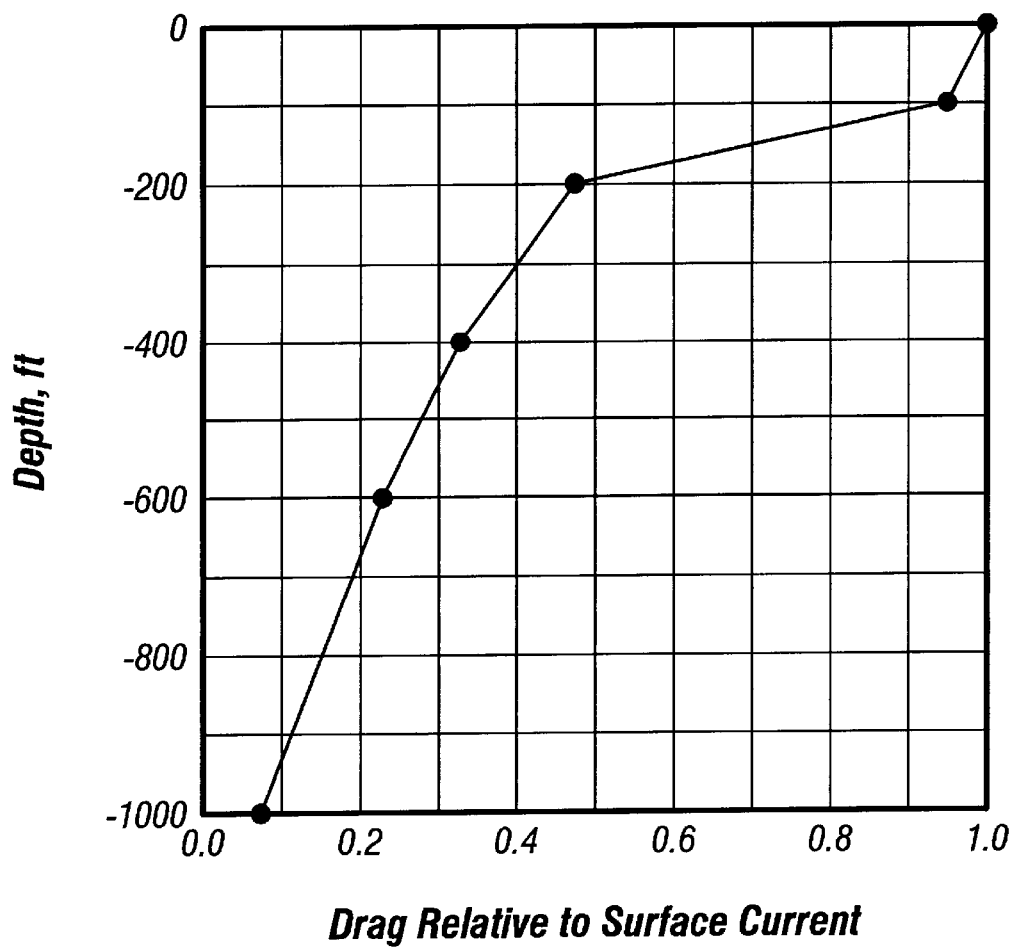
FIG. 11 is a plot of distribution over depth of the square of the velocity, normalized to the maximum value found at the surface.

FIG. 11 is a plot of distribution over depth of the square of the velocity associated with the Gulf of Mexico's oncein-10 years-occurrence loop current, normalized to the maximum value found at the surface. Assuming the drag coefficent of a circularly-cylindrical hull such as a SPAR or a marine riser is independent of its position in depth, this plot reflects the relative strength of the locally acting drag force. This plot further illustrates the concentration of drag force in the upper 200 feet of submergence depth. It suggests that drag reduction in this region would be most productive and cost effective.

The plot in FIG. 11 contains averages over 1000 feet of depth of the velocity, its square and its cube, each normalized by the corresponding function of the velocity at the surface, 3.5 kts. The linear average shows that, if the local blowing-water flow rate is made proportional to the local onset current velocity, the total blowing-water flow rate would be only 57% of that which would obtain if the blowing-water flow rate were everywhere matched to the surface current velocity. The depth-averaged current velocity is only 2.00 kts. The square root of the depth-averaged square of the local velocity is only 2.13 kts, and the total drag, being proportional to the square of the velocity (diameter and drag coefficient presumed constant) is only 37% of that if the surface current were to be maintained over the 1000 foot depth extent. Similarly, the power required to pump the blowing-water, without loss, if local jet velocity were a constant multiple of local current velocity, would be only 27% of that which would obtain if the surface current velocity value were maintained over the depth extent. It is clear, therefore, that an economy will be obtained by attempting to apportion, at least roughly, the local blowing jet velocity to the local onset current velocity. This conclusion applies to both marine riser and SPAR vessel applications. For floating drilling vessels, however, the draft is generally entirely within the 200 foot depth range of the greatest current velocities. Thus, current velocity matching appears unnecessary.

Figure 12:
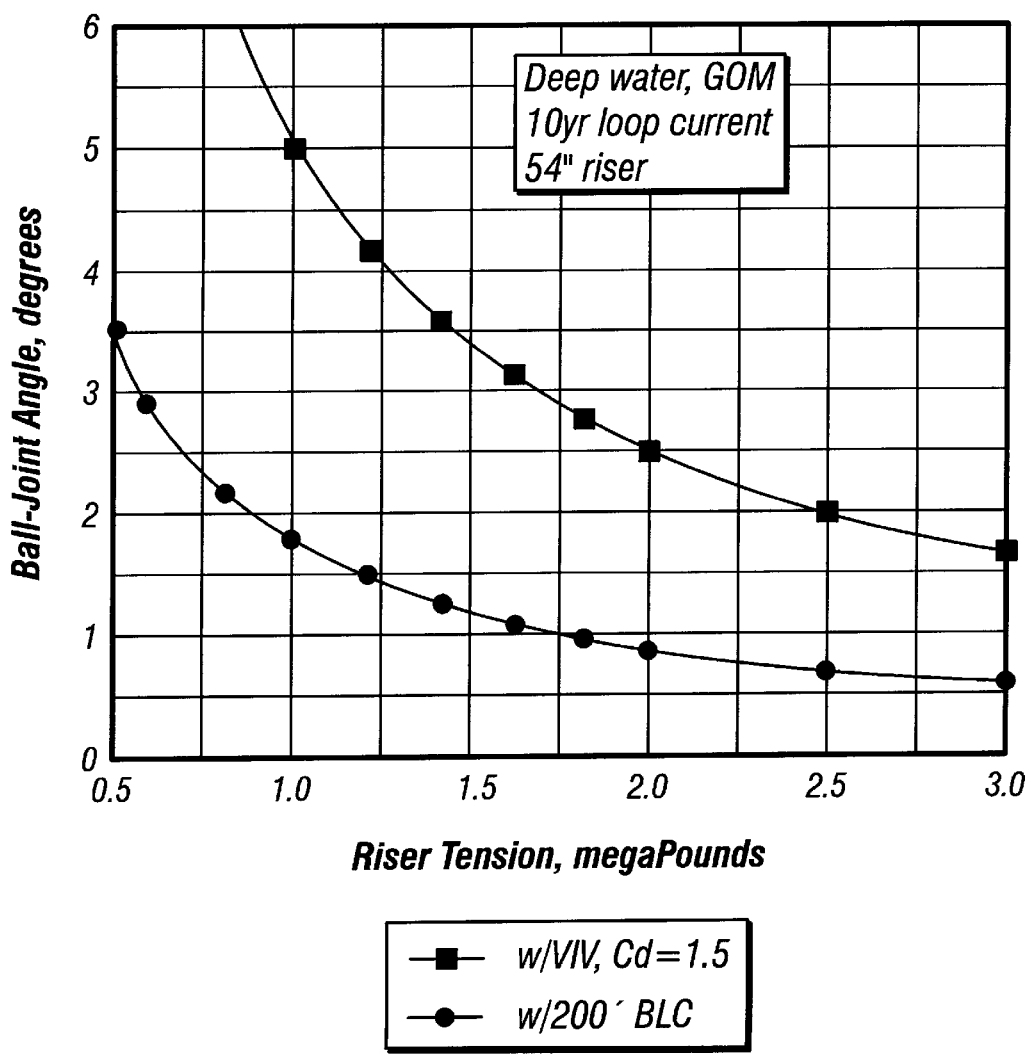
FIG. 12 is a plot illustrating a benefit of reducing the drag in the upper 200 feet of submergence of a marine riser.

FIG. 12 illustrates a benefit of reducing the drag in the upper 200 feet of submergence of a marine riser. This figure is the result of an analysis in which the following conditions were assumed: the riser is deployed in deep water in the Gulf of Mexico (more than 4000 feet of water depth); the 54" riser structure is beset by the current velocity profile of FIG. 10, resulting in an unmitigated drag distribution proportional to that of FIG. 11; the upper balljoint (or gimbal joint) is maintained vertically above the lower balljoint at the sea bed, in known fashion; the riser structure is everywhere rendered neutrally buoyant by the application of distributed buoyancy material, such as buoyancy material 908 shown in FIG. 9; the bending stiffness of the riser structure is governed by the applied tension as though it were a string, rather than as a beam (which is indeed quite true for tension values greater than one million pounds); the riser structure, because of VIV, suffers a drag coefficient ($C_d$) of 1.5 in its unmitigated state; and BLC entirely removes the drag from the topmost 200 feet.

The upper curve of FIG. 12 (indicated by squares) shows the estimated angle at the upper balljoint resulting from the applied drag forces without any drag reduction, as a functions of applied riser tension. It is clear that increased tension stiffens the riser and reduces the balljoint angle induced by those drag forces. Balljoint angles greater than about two degrees may cause cessation of frilling because of binding of the drill string which runs through the riser, with consequent severe economic consequences. Additionally, the balljoint angle is indicative of bending strain, hence stress, in the riser, to which is added that due to tension, and finally an alternating stress due to VIV. The sum of these stresses threatens fatigue failure of the riser structure.

The lower curve of FIG. 12 (indicated with dots) shows the estimated upper balljoint angle if the drag on the upper 200 feet of riser is removed along with its associated VIV. This illustrates the benefits in operability of the rig, as well as the reduction in associated riser stresses and fatigue that may be obtained by a successful, limited application of BLC drag and VIV reduction.

Figure 13:
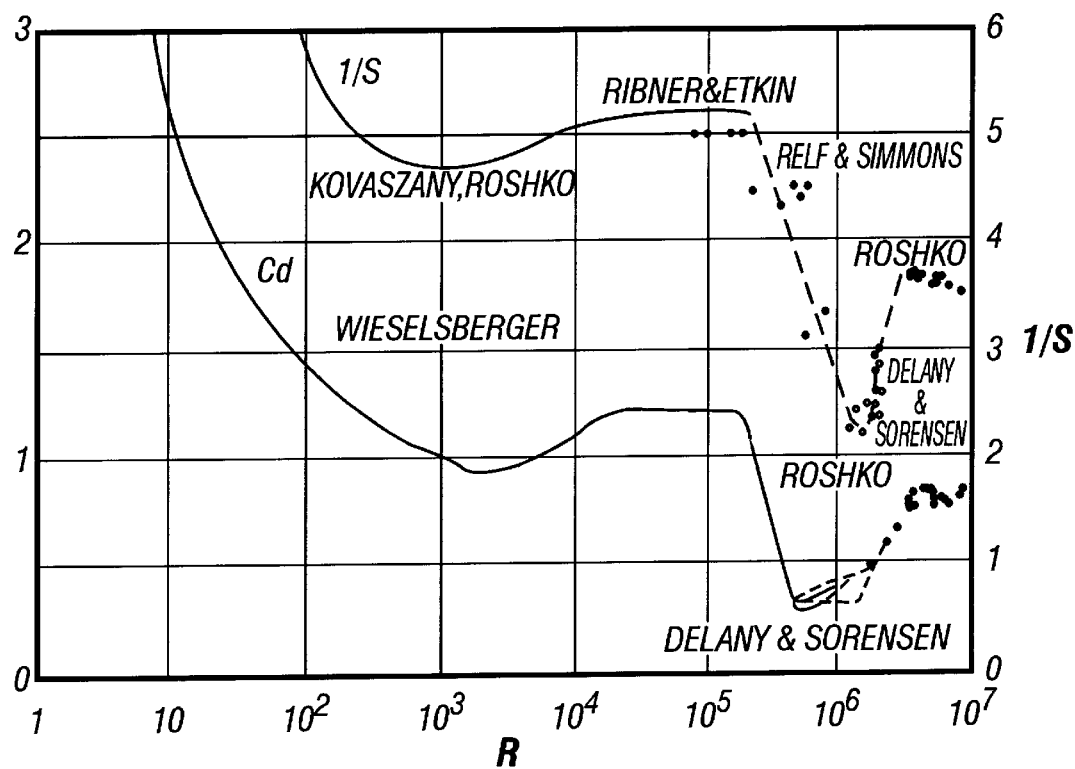
FIG. 13 is a plot showing data on the drag coefficient ($C_d$) and Strouhal number (S) of vortex shedding for circular cylinders at high diameter-Reynolds numbers (R).

FIG. 13, taken from A. Roshko, "Experiments on the Flow Past a Circular Cylinder at Very High Reynolds Number, 10 Journal of Fluid Mechanics at 345–56 (1961), shows data on the drag coefficient ($C_d$) and Strouhal number (S) of vortex shedding for circular cylinders at high diameter-Reynolds numbers (R). The referenced data reported and plotted by Roshko is at the highest values of Reynolds numbers known to the inventors, i.e., approaching $10^7$. By comparison, the Reynolds number for a 54 inch diameter riser in a sea water current of 3.5 kts. is approximately $2.7 \times 10^6$, which is within the reported data range, while that for a 120 foot diameter SPAR vessel in the same current is about $7.2 \times 10^7$, which is beyond the reported data range.

It may be seen that the drag coefficient for the riser case is approximately 0.8 and generally locally increasing steeply from lower values at somewhat smaller Reynolds numbers. It should be noted that Roshko's drag data were acquired on a smooth cylinder model with a downstream splitter plate fitted to prevent vortex shedding, rendering the drag and pressure distribution on the cylinder model to be time invarient. Drag coefficients reported by Delaney and Sorensen (per Roshko FIG. 13) are quite low. An assumption of a drag coefficient equal to 1.0 for a real, somewhat rough cylinder in a high interval of Reynolds number is not unreasonable, provided VIV is absent. With VIV, the drag coefficient may be doubled.

The Strouhal number (S) for vortex shedding (defined as the product of shedding frequency in Hertz multiplied by diameter and divided by current velocity), is seen to be a good deal smaller according to Rosbko's data and than that of Delaney and Sorensen at slightly smaller Reynolds numbers. Roshko also shows a general moderate increase in Strouhal number with increasing Reynolds number within the range of his data. The value of S deducible from Roshko's data appears to be about 0.27, which is a good deal higher than the value of 0.2 that is nominal and apparently consistent with a drag coefficient of 1.0, according to Roshko's plots. Extrapolating Roshko's data, one would expect the shedding Strouhal number for a SPAR vessel to be about 0.3 or even higher. Thus, without BLC mitigation, the frequency of VIV motions, with consequent accelerations and structural fatigue, are increased relative to expectations for large structures beset by ocean currents at high Reynolds numbers.

As is apparent from the above and by actual experience, the drag and VIV of large cylinders is not mitigated by virtue of their very high Reynolds numbers. The conclusion is that drag and VIV reduction by BLC is desirable.

Figure 14:
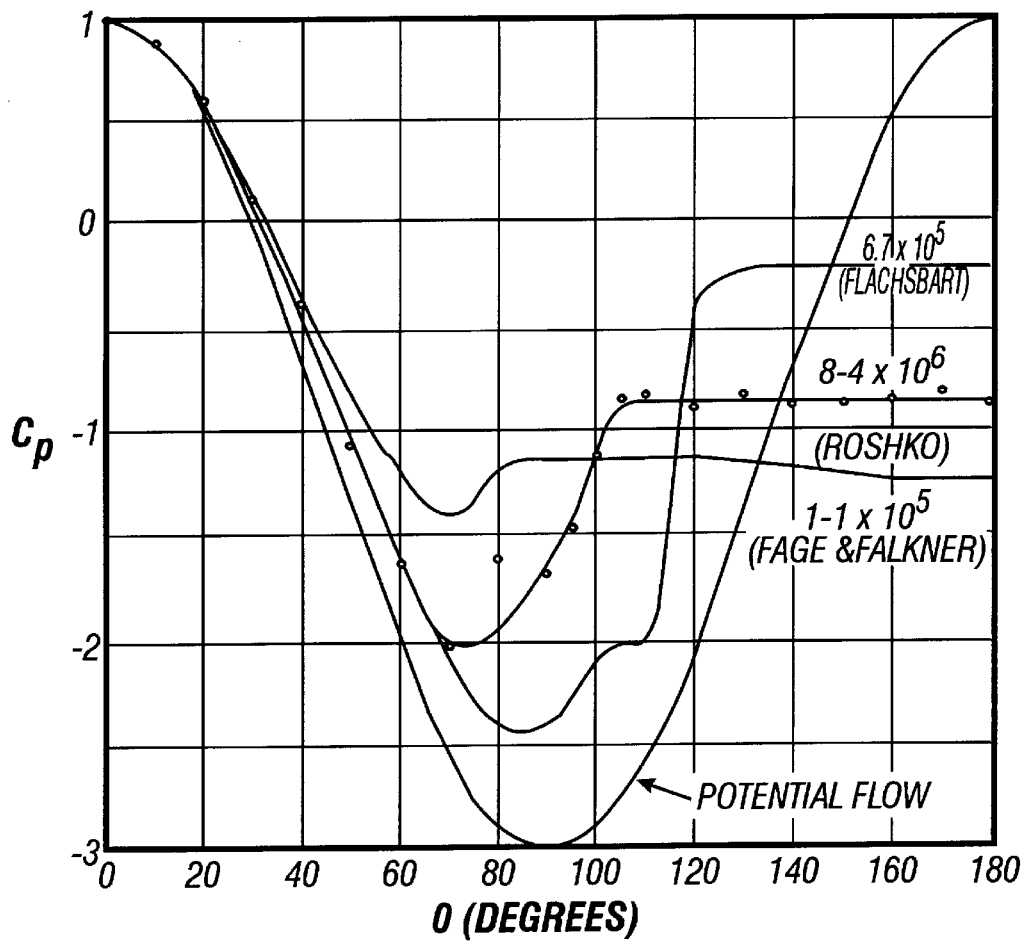
FIG. 14 is a plot showing the distribution of time-averaged pressure ($C_p$) versus angle ($\theta$) about a circular cylinder according to three measurements at relatively high diameter-Reynolds numbers, as well as the theoretical pressure distribution for potential flow, i.e., of infinite Reynolds number.

FIG. 14, also taken from Rosbko, is a plot showing the distribution of time-averaged pressure ($C_p$) versus angle (θ) about a circular cylinder according to three measurements at relatively high diameter-Reynolds numbers, as well as the theoretical pressure distribution for potential flow, i.e., at infinite Reynolds number. The angular coordinate of the abscissa is measured from the "nose" at zero degrees to the "tail" at 180 degrees. The pressure coefficient of the ordinate represents the difference between local pressure on the cylinder surface and that in the onset flow at a distance (at the same height) divide by the dynamic pressure of the onset flow velocity.

It is apparent from FIG. 14 that, between the angles of 30 and 150 degrees relative to the onset current, the surface pressure in potential (ideal, frictionless) flow is lower than in the environment. The pressure is lowest at 90 degrees to the current vector. However, since the pressure distribution on a circular cylinder in potential flow is symmetric about a diameter perpendicular to the onset flow (90 degrees), there is no net pressure drag in the ideal flow case, which paradoxical result is indeed predicted by theory.

The reported experimental data, however, show considerable asymmetry, thereby yielding substantial pressure drag. Over the forward part of the cylinder (0–90 degrees), the measured pressures tend to approach the potential flow values increasingly with Reynolds number, although the effects of boundary layer development are apparent. The pressures on the after part of the cylinder (90–180 degrees), depart substantially from the potential flow values, reflecting separated flow, and in a seemingly unsystematic manner relative to Reynolds number. Considering the for-and-aft projected areas of the cylinder upon which these pressures act, the associated pressure drag forces are seen to be consistent with the drag coefficient variations with Reynolds number seen in FIG. 14. The ultimate objective of the BLC system is to return the cylinder pressure distribution to a more nearly symmetric form, and thereby reducing or eliminating pressure drag and associated VIV. In any event, pressure distributions such as these must be sensed and interpreted by the BLC control system in order to estimate the direction and strength of the onset current.

Figure 15:
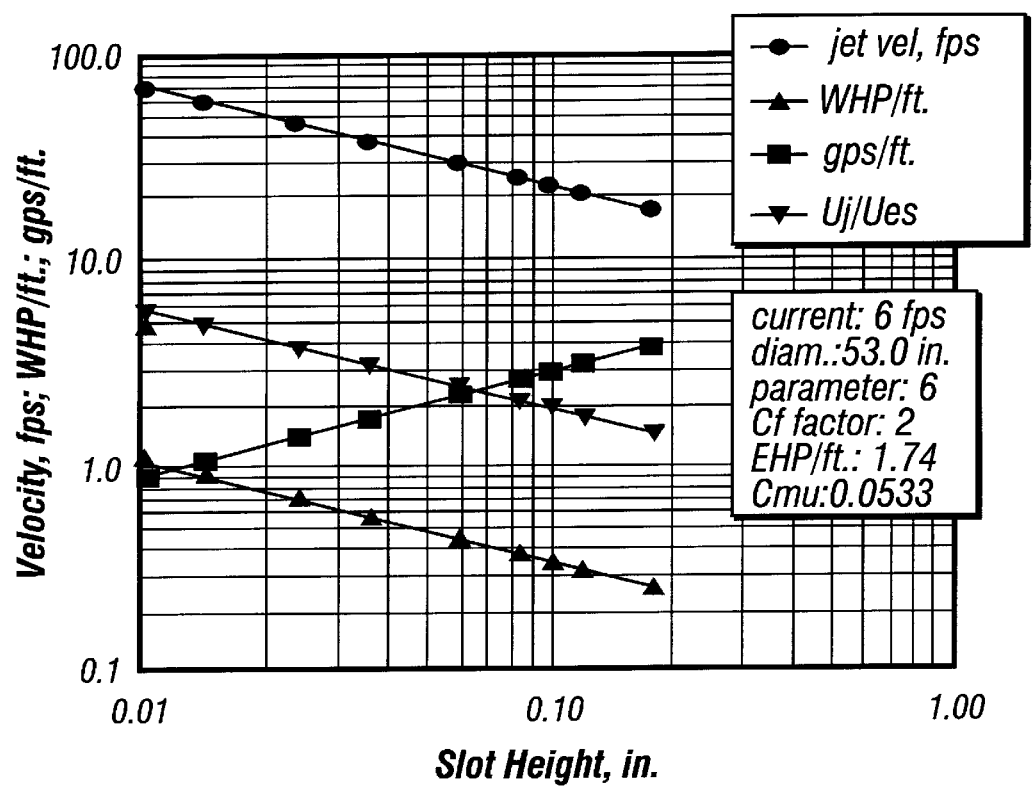
FIG. 15 is a plot showing preliminary estimates of BLC characteristics as applied to a marine riser.

FIG. 15 is a plot showing preliminary estimates of BLC system characteristics as applied to a marine riser. The surface value of the 10 year loop current in the Gulf of Mexico (see FIG. 10) is assumed as approximately 6 fps. The "parameter" value of 6 represents the ratio of the momentum inserted into the boundary layer at each blowing slot-nozzle to the momentum deficit of that boundary layer approaching that location. An additional measure of conservatism is manifest in the factor of 2 applied to the friction drag coefficient that determines the boundary layer's momentum deficit.

With the stated diameter of the riser cylinder, these parameter values yield a value of about 0.05 for the blowing coefficient (Cÿ) which represents the ratio of single slot-nozzle thrust-to-cylinder drag at unity drag coefficient. Extrapolating the results of J. E. Hubbartt and L. H. Bangert, "Turbulent Boundary Layer Control by a Wall Jet," AIAA Paper 70-107, 8th Aerospace Sciences Meeting Jan. 19–21, 1970 (New York), which results were obtained at a lower Reynolds number than described above, gives assurance that, with a momentum ratio of 6, complete avoidance of flow separation on a riser with its associated pressure drag and VIV will be avoided.

FIG. 15 exhibits the blowing jet velocity (circle symbol), the ratio of same to local current flow velocity outside the boundary layer at the slot location (triangle symbol, point down), the flow rate (square symbol), and the blowing water horsepower (triangle symbol, point up); the latter two: per unit height of riser are all plotted against the gap height of the blowing nozzle slots. A slot gap height of 0.014" has been selected, which requires a jet velocity of 60 fps, ten times the onset current velocity at the sea surface and five times the local current velocity. The flow required is 1.1 g.p.s. per foot of riser height. The pumping water horsepower is about 0.9 HP/ft, which compares favorably with the noted unmitigated drag power of 1.74 HP/ft.

FIG. 16 is a cross-section of a horizontal pontoon 1600 of a semi-submerged drilling platform (not shown). As shown here, the horizontal pontoons 1600 of a semi-submerged drilling platform, as well as, occasionally, the vertical columns, generally have a rectangular cross-section with flat sections 1602 and rounded corners 1604. To provide BLC for the pontoon 1600, longitudinal blowing slot-nozzles 1606 are fitted at the intersections of the arcs of corners 1604 and the adjacent flat sections 1602 that form the sides 1608, 1609, top 1610, and bottom 1612 of the pontoon 1600. There are therefore, preferably, eight such slot-nozzles 1606 arrayed along the length of the pontoon 1600.

In a transverse section of the pontoon 1600, a pair of tangentially dischargeable slot-nozzles 1606 are installed at each corner 1604. Each such slot-nozzle 1606 discharges in a direction parallel to the local component of current velocity, generally from the flat section 1602 toward the arc of the rounded corner 1604. As in both the SPAR and marine riser applications, each such slot-nozzle 1606 is supplied blowing-water by means of a proximate longitudinal conduit 1614 charged by a pumping system (not shown).

Assuming FIG. 16 is looking forward, when beset by a current from a port side 1616, the pair of slot-nozzles 1606 bounding the port side panel 1608 are selectively activated 1618, 1619 to assist the flow to traverse the corners 1604 facing the current 1616 without separation. Further, the pair of slot-nozzles 1606 rightwardly bounding the top 1610 and bottom 1612 panels of the pontoon 1600 are selectively activated 1620, 1621 to re-energize the boundary layers exiting the top 1610 and bottom 1612 surfaces and prevent flow separation with its associated pressure drag on the starboard side 1609 of the pontoon 1600. When the pontoon 1600 is beset by a current from the starboard side, the mirror image of the above arrangement obtains.

A number of embodiments of the present invention have been described. Neverthe-less, it will be understood that various modifications may be made without departing from the spirit and scope of the invention. Accordingly, other embodiments are within the scope of the following claims.

What is claimed is:

1. A system for reducing hydrodynamic drag and vortex-induced-vibration ("VIV") of a bluff hull beset by a current, comprising:

a. a bluff hull, designed to be at least partially submerged in an exterior fluid, the bluff hull having a hull interior and a hull surface, the hull surface having an up-current side and a down-current side such that the up-current side may be beset by a current present in the exterior fluid, wherein the bluff hull has an axis and is substantially cylindrical with the axis running along the height of the cylinder, and wherein the current has a current velocity, and b. at least one opening of the hull surface for passing an interior fluid out of the hull interior into the exterior fluid so as to reduce flow separation of the current on the down-current side of the hull surface, wherein the opening passes the interior fluid out of the hull interior at an angle substantially tangential to the hull surface at the location of the opening and substantially parallel to the direction of the current, wherein the opening blows the interior fluid out of the hull interior at a blowing velocity greater than the current velocity, wherein the opening is a slot-nozzle substantially aligned with the axis of the bluff hull;

c. the at least one opening comprising a plurality of slot-nozzles substantially aligned with the axis and disposed around the surface of the bluff cylindrical hull; and d. a control system for controllably opening and closing the plurality of slot-nozzles, wherein the control system includes a hydraulic system for opening and closing the plurality of slot-nozzles and includes a valves and wherein the hydraulic system includes a valve, coupled to a bladder, for controllably passing high-pressure fluid into the bladder to expand the bladder, the bladder being coupled to a slot-nozzle such that when the bladder is expanded the slot-nozzle is open.

2. A system for reducing hydrodynamic drag and vortex-induced-vibration ("VIV") of a bluff hull beset by a current, comprising:

a. a bluff hull, designed to be at least partially submerged in an exterior fluid, the bluff hull having a hull interior and a hull surface, the hull surface having an up-current side and a down-current side such that the up-current side may be beset by a current present in the exterior fluid;

b. at least one opening of the hull surface for passing an interior fluid out of the hull interior into the exterior fluid so as to reduce flow separation of the current on the down-current side of the hull surface;

c. a cavity in the hull interior for holding the interior fluid; and d. a conduit, located in the hull interior and coupled to the cavity and to the opening, for conveying the interior fluid to the opening.

3. The system of claim 2 wherein the opening is a slot-nozzle having a vertical length and the conduit is an elongated space disposed along at least the vertical length of the slot-nozzle.

4. The system of claim 3 wherein the bluff hull is a marine riser having a vertical length, having a plurality of slot-nozzles that open at the surface of the marine riser, and having a plurality of conduits each corresponding to at least one of the slot-nozzles, the slot-nozzles and conduits being disposed along the vertical length of the marine riser.

5. A system for reducing hydrodynamic drag and vortex-induced-vibration ("VIV") in a bluff hull, comprising:

a. a bluff hull, designed to be at least partially submerged in water, the bluff hull having a cavity for holding fluid and a hull surface, the hull surface having an up-current side and a down-current side such that the up-current side may be beset by a current present in the water in which the bluff hull is at least partially submerged, the current having a velocity, wherein the bluff hull has an axis along a long dimension of the bluff hull;

b. at least one nozzle in the hull surface for blowing the fluid contained in the cavity out of the hull surface and into the water at a velocity greater than the current velocity and at an angle substantially tangential to the hull surface at the location of the nozzle and substantially in the direction of the current so as to reduce flow separation of the current on the down-current side of the hull surface; and c. a plurality of slot-nozzles disposed at the hull surface along the lone dimension of the bluff hull, each slot-nozzle for blowing fluid held in an internal cavity of the bluff hull out of the hull surface and into the water at an angle substantially tangential to the hull surface and substantially in the direction of the current; and d. a control system for selectively activating and deactivating each slot-nozzle.

* * * * *